(12) United States Patent
Wu et al.

(10) Patent No.: US 9,185,160 B2
(45) Date of Patent: Nov. 10, 2015

(54) RESOURCE RESERVATION PROTOCOL OVER UNRELIABLE PACKET TRANSPORT

(75) Inventors: Yuguang Wu, Mountain View, CA (US); Charles J. Zhou, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1316 days.

(21) Appl. No.: 11/673,915

(22) Filed: Feb. 12, 2007

(65) Prior Publication Data

US 2008/0195719 A1  Aug. 14, 2008

(51) Int. Cl.
*G06F 15/173* (2006.01)
*H04L 29/08* (2006.01)

(52) U.S. Cl.
CPC ...................... *H04L 67/10* (2013.01)

(58) Field of Classification Search
CPC ..... H04L 29/06; H04L 67/10; G06F 12/0813; G06F 12/0817; G06F 12/0822; G06F 12/0831; G06F 12/084; G06F 12/0842; G06F 12/0862; G06F 3/0689; G06F 9/3004; G06F 9/50; G06F 2212/2542
USPC ................................................. 709/214, 226
See application file for complete search history.

(56) References Cited

U.S. PATENT DOCUMENTS

| | | | | |
|---|---|---|---|---|
| 5,649,102 A | * | 7/1997 | Yamauchi et al. | 709/213 |
| 6,047,356 A | * | 4/2000 | Anderson et al. | 711/129 |
| 6,148,379 A | * | 11/2000 | Schimmel | 711/152 |
| 6,249,802 B1 | * | 6/2001 | Richardson et al. | 709/200 |
| 6,275,907 B1 | * | 8/2001 | Baumgartner et al. | 711/143 |
| 6,598,130 B2 | * | 7/2003 | Harris et al. | 711/147 |
| 6,760,786 B2 | | 7/2004 | Hagersten | |
| 6,760,809 B2 | | 7/2004 | Arimilli et al. | |
| 6,785,783 B2 | | 8/2004 | Buckland | |
| 6,877,030 B2 | * | 4/2005 | Deneroff | 709/213 |
| 6,892,280 B2 | | 5/2005 | Nakamura | |
| 2003/0084076 A1 | * | 5/2003 | Sekiguchi et al. | 707/205 |
| 2005/0108496 A1 | | 5/2005 | Elnozahy et al. | |

(Continued)

OTHER PUBLICATIONS by B. Wilkinson & M. Allen, Slides for Parallel Programming Techniques & Applications Using Networked Workstations & Parallel Computers 2nd ed., 2004, Pearson Education Inc.*

(Continued)

*Primary Examiner* — Christopher Biagini
(74) *Attorney, Agent, or Firm* — Robert C. Kowert; Meyertons, Hood, Kivlin, Kowert & Goetzel, P.C.

(57) ABSTRACT

A system and method for allocating physical memory in a distributed, shared memory system and for maintaining interaction with the memory using a reservation protocol is disclosed. In various embodiments, a processor node may broadcast a memory request message to a first subset of nodes connected to it via a communication network. If none of these nodes is able to satisfy the request, the processor node may broadcast the request message to additional subsets of nodes until a positive response is received. The reservation protocol may include a four-way handshake between the requesting processor node and a memory node that can fulfill the request. The method may include creation of a reservation structure on the requesting processor and on one or more responding memory nodes. The reservation protocol may facilitate the use of a proximity-based search methodology for memory allocation in a system having an unreliable underlying transport layer.

20 Claims, 12 Drawing Sheets

(56) References Cited

U.S. PATENT DOCUMENTS

| | | |
|---|---|---|
| 2005/0160226 A1 | 7/2005 | Averill et al. |
| 2005/0240748 A1 | 10/2005 | Yoder |
| 2006/0064518 A1 | 3/2006 | Bohrer et al. |
| 2006/0259704 A1 | 11/2006 | Wyman |
| 2007/0250604 A1* | 10/2007 | Wu et al. ............... 709/220 |
| 2008/0195719 A1* | 8/2008 | Wu et al. ............... 709/213 |
| 2008/0222366 A1* | 9/2008 | Hieda ............... 711/148 |
| 2009/0144388 A1* | 6/2009 | Gross et al. ............... 709/213 |

OTHER PUBLICATIONS

US Appl. No. 11/409,205, filed Apr. 21, 2006.

* cited by examiner

| request identifier 901 | state 902 | timeout value 903 | radius 904 | timeout timer 905 |

| request identifier 951 | state 952 | timeout value 953 | timeout timer 955 |

RESOURCE RESERVATION PROTOCOL OVER UNRELIABLE PACKET TRANSPORT

BACKGROUND OF THE INVENTION

1. Field of the Invention

This invention relates to computing systems and more particularly to memory allocation within a distributed shared memory system having unreliable packet transport.

2. Description of the Relevant Art

Computer systems that include one or more banks of memory may use different architectures to organize and access that memory. Some computer systems may include a single, dedicated bank of memory for each of one or more processors and accessible only by that processor. In these distributed configurations, memory access times may be highly predictable, as the dedicated memory bank may respond according to uniform memory access times. In such configurations, no other processors (or their processes) may be able to access the dedicated bank of memory, so the local processor may have complete control over the memory accesses for its processes. Such configurations may not provide flexibility in terms of the amount of memory available for any one process, if the processor can only access its own local memory.

Other computer systems are configured to include a single memory space that is shared between two or more processors. While this configuration may allow flexibility for each processor to address different amounts of memory for different processes, it may not efficiently scale to large systems. For example, in a computer system including two processors, if both processors need to access the shared memory at the same time, one processor may sit idle while waiting for a turn to access data, negatively impacting system performance. The problem may be compounded when more processors are included in the system.

Some computer systems are configured to include features of both a shared memory architecture and a dedicated memory architecture, in what is called a Distributed Shared Memory (DSM) system. In DSM systems, a separate (local) memory may be provided for each processor, but each of the processors may also be able to access non-local memory, such as a shared block of main memory. Some DSM systems are page-based systems, in which a linear memory space is distributed between processors based on one or more fixed memory partitions, such as a page size. Other DSM systems are object-based systems, in which processes on multiple machines share an abstract memory space filled with shared objects.

Some DSM systems employ a non-uniform memory access or non-uniform memory architecture (NUMA). Under NUMA, the memory access time for any given access depends on the location of the accessed memory relative to the processor. In such systems, the processor can typically access its own local memory, such as its own cache memory, faster than non-local memory. In these systems, non-local memory may include one or more banks of memory shared between processors and/or memory that is local to another processor.

In a NUMA shared memory multiprocessor computer system, each processor, on behalf of some process, may from time to time need to allocate some memory. If sufficient local memory is available, the processor may allocate local memory to the process. If not, the processor may need to allocate non-local memory. In general, if the processor is able to allocate nearby memory, according to the system configuration, the latency of accesses to that memory may be reduced and the performance of the system may be increased. In conventional systems a centralized scheme, in which a single processor is responsible for memory allocations for all processors, may be used to allocate nearby non-local memory to a processor, but such a scheme may lack the ability to efficiently scale to large systems. In addition, prior art memory allocation schemes often assume that packet transport is reliable, and may not be suitable for use in systems having an underlying transport layer that is unreliable.

SUMMARY

A computer system may include multiple processor nodes, memory nodes and other nodes connected via a network according to any of various network topologies. Some such computer systems may employ a non-uniform memory access or non-uniform memory architecture (NUMA) configuration, as described above. In a NUMA shared memory multiprocessor computer system, each processor, may, in some embodiments, allocate to its processes the nearest available physical memory capable of satisfying the memory requirements of those processes, using a proximity-based memory allocation scheme. In systems in which the underlying transport layer may not be reliable, a four-way handshake may be employed to establish and maintain interaction between a processor node and the nearest available memory.

In one embodiment, a system may include a processor node and a plurality of memory nodes, where the processor node includes a processor and a network interface and the memory nodes each include a memory and a network interface. A communication network may be configured to interconnect the processor node and the plurality of memory nodes via the network interfaces according to a network topology. In one embodiment, each of the memory nodes may be removed from the processor node by a respective number of network hops according to the network topology.

The processor may be configured to broadcast a memory request message including a unique identifier and a requested memory size to a first subset of the plurality of memory nodes, where each memory node of the first subset is removed from the processor node by no more than a given number of network hops. The processor may also be configured to create a reservation structure for the given memory request including the unique identifier and a timeout value. In some embodiments, the processor may be configured to wait for a reply to the memory request until a timer reaches the timeout value. If the timer reaches the timeout value before a reply message is received in response to the memory request message, the processor node may in some embodiments be configured to re-send the memory request message.

If no memory node of the first subset indicates that it can satisfy the memory request, the processor may be configured to increase the number of network hops and broadcast the memory request to a second subset of the plurality of memory nodes, where each memory node of the second subset is removed from the processor node by no more than the increased number of network hops.

In some embodiments, if no memory node of the second subset indicates that it can satisfy the given memory request, the processor node may be further configured to continue to increase the given number of network hops and to broadcast the given memory request to a corresponding subset of the plurality of memory nodes, where each memory node of the corresponding subset is removed from the processor node by no more than the increased number of network hops, until at least one of the following occurs: one or more of the memory nodes indicates that it can satisfy the memory request, the processor node has broadcast the memory request to each of the memory nodes, or a time-out condition has been met.

If one of the memory nodes can satisfy the memory request, the memory node may be configured to reserve a portion of memory at least as large as the requested memory size and to send a reservation acknowledgement message including the unique identifier to the processor node. If the processor node receives the reservation acknowledgement message, it may be configured to send a confirmation message to the memory node. If two or more memory nodes indicate that they can satisfy the memory request, the processor may be configured to select a particular one of the memory nodes, to send a confirmation message to the particular (i.e., selected) memory node, and to send a reject message to each of the other memory nodes.

In response to receiving the confirmation message, the memory node may in some embodiments be configured to create a reservation structure for the memory request, including the unique identifier and a timeout value, and to send a commit message including the unique identifier to the processor node. In some embodiments, the timeout value may be dependent on a time-to-live value included in the memory request message. If a timer of the memory node reaches the timeout value before a reply message is received in response to a given message being sent, the memory node may in some embodiments be configured to re-send the given message.

Subsequent to receiving the commit message, the processor node may access memory on the memory node (e.g., to perform read and write operations on behalf of a process executing on the processor node). The memory node may in some embodiments be configured to return a read acknowledgement or write acknowledgement message (each including the unique identifier) in response to receiving read or write requests, respectively, from the processor node (each including the unique identifier).

When the processor node no longer requires access to the memory allocated for the memory request, it may be configured to send a reject message including the unique identifier to the memory node. When the memory node receives the reject message, the memory node may be configured to free the memory allocated for the memory request and to send a reject acknowledgement message including the unique identifier to the processor node. The processor node may also be configured to send a reject confirmation message including the unique identifier to the memory node in response to receiving the reject acknowledgement message. If a reservation structure has been created on the memory node, the memory node may be configured to delete the reservation structure in response to receiving the reject message. Similarly, if a reservation structure has been created on the processor node, the processor node may be configured to delete the reservation structure in response to receiving the reject acknowledgement message.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In various embodiments of a distributed shared memory (DSM) system comprising one or more processors, a separate (local) memory may be provided for each processor, but each processor may also be able to access non-local memory, such as a shared block of main memory. Some DSM systems employ non-uniform memory access or non-uniform memory architecture (NUMA). Under NUMA, the memory access time for any given access depends on the location of the accessed memory relative to the processor accessing it. In such systems, a processor may be able to access its own local memory, such as its own cache memory or a memory co-located with the processor on the same integrated circuit device or printed circuit board, faster than it can access non-local memory. In these systems, non-local memory may include one or more banks of memory shared between processors and/or memory that is local to another processor. One example of a system that might employ a NUMA architecture is an application server.

In some embodiments of NUMA shared memory multi-processor systems, each processor may allocate to its processes a physical memory capable of satisfying the memory requirements of those processes, based on the current memory utilization, using a proximity-based memory allocation technique. In some embodiments, a proximity-based memory allocation technique, as described herein, may be used to find the nearest available physical memory. The first memory to respond favorably to a memory request broadcast according to the allocation scheme may, in some embodiments, be designated as the nearest available memory. In other embodiments, the memory that is nearest to the processor and that responds favorably to the request may be designated as the nearest available memory.

Figure 1:
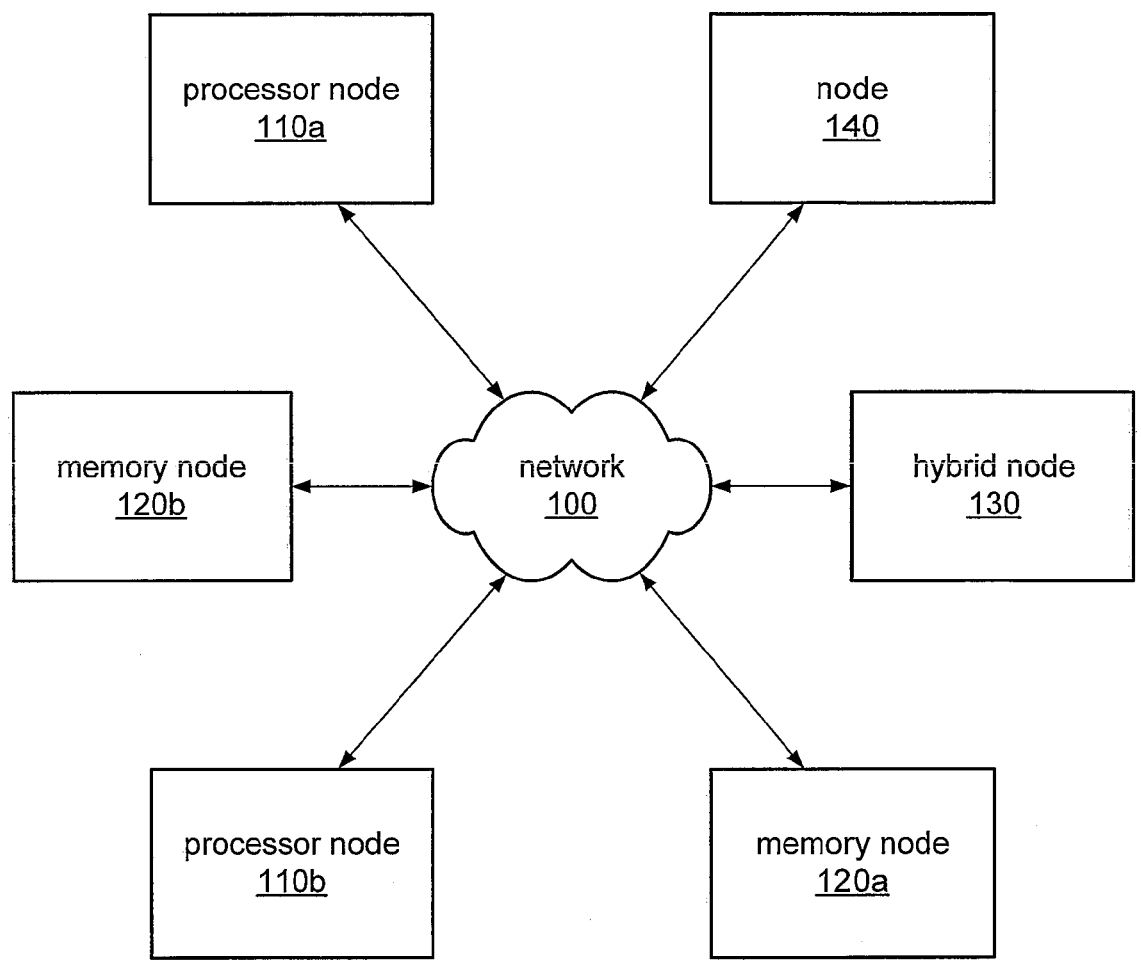
FIG. 1 illustrates an exemplary computer system suitable for implementation of memory allocation via a proximity-based allocation technique.

In various embodiments, a plurality of nodes making up a computer system may be connected via a communication network. For example, FIG. 1 illustrates a communication network 100 connecting various types of nodes. In this example, two processor nodes (110a and 110b), two memory nodes (120a and 120b), one hybrid node (130), and one other node (140) are all connected to each other via network 100. These nodes may be connected to each other according to any of various network topologies, including, but not limited to, a linear topology, a hierarchical (tree) topology, a star topology, a mesh topology, a grid topology, a ring topology, a toroidal (torus) topology, a cube topology, a hypercube topology, or any other network topology, according to various embodiments. Each of the memory nodes of the computer system may be removed from a processor node of the computer system by a respective number of network hops according to the network topology. In some embodiments, there may be more or fewer processor nodes 110, memory nodes 120, hybrid nodes 130 or other nodes 140 connected via network 100 than in the embodiment illustrated by FIG. 1.

In some embodiments, a computer system including network 100 and various processor nodes 110, memory nodes 120, hybrid nodes 130 and other nodes 140, may employ a NUMA architecture. In such embodiments, a processor node 110 may be configured to allocate some amount of memory for one of its processes. The memory access time may depend on how far removed the memory allocated to the process is from the processor according to the topology of network 100. For example, if the memory that is allocated to the process is one network hop away from the requesting processor, the access time may be shorter than if the memory that is allocated to the process is two network hops away from the requesting processor. In some embodiments, the shortest memory access time may be realized when the processor is able to allocate its own local memory to the process and does not have to request memory from another node.

Figure 2A:
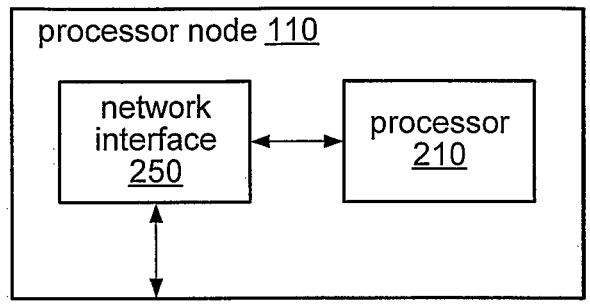
FIGS. 2A-2C illustrate various nodes of a computer system suitable for implementation of a proximity-based memory allocation technique, according to one embodiment.
Figure 2B:
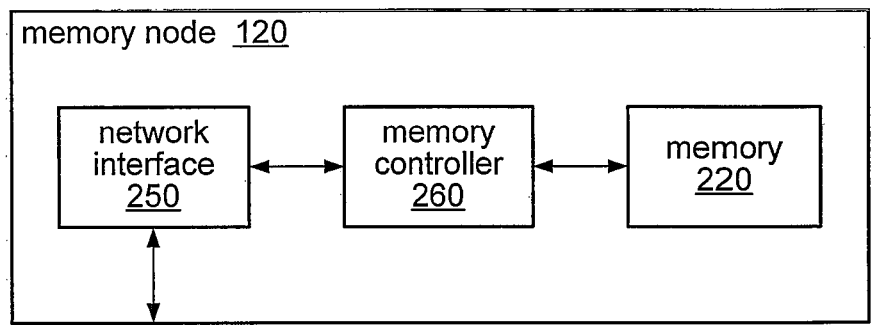
Figure 2C:
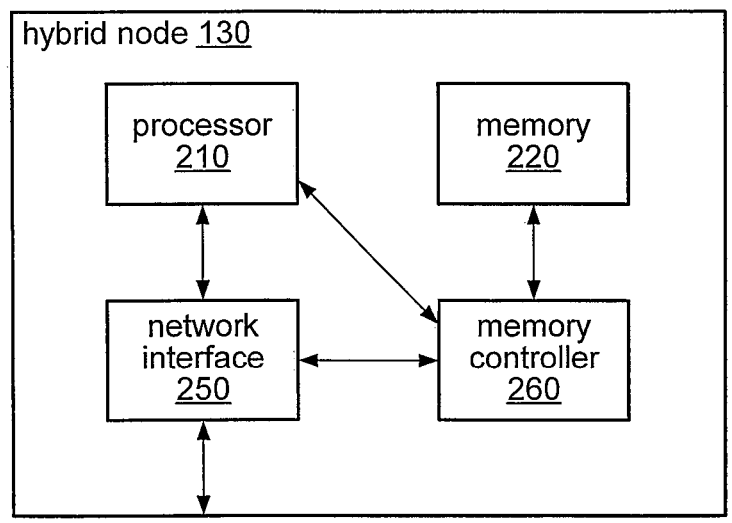

The nodes connected to network 100 may be any of various functional types, including, but not limited to, processor nodes 110, memory nodes 120, hybrid nodes 130, and nodes with other functionality, such as nodes 140. In some embodiments, individual nodes may include combinations of functionality found in two or more other node types. Three examples of nodes that may be connected to network 100 in a NUMA architecture are illustrated by FIGS. 2A-2C. FIG. 2A illustrates a processor node 110, according to one embodiment. In this example, processor node 110 includes a processor (CPU) 210 and a network interface 250, configured to couple processor node 110 to network 100. In different embodiments, these functional elements may be implemented in hardware (such as in one or more integrated circuits or printed circuit boards), in software (executing on processor 210 or another suitable device), or in a combination of hardware and software.

Processor 210 may, in various embodiments, be configured to implement any suitable instruction set architecture (ISA), such as x86, SPARC, PowerPC, etc. Processor 210 may comprise a single CPU core, multiple CPU cores, or any combination of one or more general CPU cores and special-purpose cores (e.g., digital signal processors, hardware accelerators, co-processors, etc.) In various embodiments, processor 210 may comprise a superscalar architecture or may be configured to implement multi-threading.

Network interface 250 may, in various embodiments, be configured to implement different communication protocols or standards, such as Ethernet, HyperTransport (HT), Infiniband, or any other suitable interface technology. Network interface 250 may implement wired or wireless technologies via electrical, optical, or radio-based media, in different embodiments.

Network interface 250 may, in some embodiments, be configured to function as a relaying carrier for packets traveling on network 100. In such embodiments, network interface 250 may be configured to implement the concept of time-to-live (TTL) prevalent in data networking. For example, each packet traveling on network 100 may include in its header a TTL field, which is decremented at each intermediate relaying carrier on the packet's way toward its final destination. In some embodiments, when the TTL value is decremented to zero, the packet will be dropped; that is, it will not be forwarded from that carrier to any other nodes. In other embodiments, the value of a TTL field may be incremented as it travels on network 100 and may be dropped when it reaches a predetermined maximum value.

A processor node 110 may also include other hardware or software components, depending on the functionality of the node, in some embodiments. In some embodiments, the functional elements of processor node 110 may be partitioned into more or fewer hardware or software components or all of the functionality may be included in a single component, such as a single integrated circuit chip or printed circuit board. In some embodiments, processor node 110 may include local memory, such as cache memory. Cache memory may be implemented as a separate component of processor node 110 or may be integrated into processor 210, in different embodiments.

An exemplary memory node 120 is illustrated by FIG. 2B. In this example, memory node 120 includes memory 220, a memory controller 260 configured to control access to memory 220, and a network interface 250 configured to connect memory node 120 to network 100. These functional elements may be implemented in hardware (such as in one or more integrated circuits or printed circuit boards), in software (executing on memory controller 260 or another processor or other suitable device included in memory node 120 or elsewhere on network 100), or in a combination of hardware and software, according to various embodiments. Network interface 250 may, in some embodiments, be configured to function as a relaying carrier, as described above, for packets traveling on network 100. A memory node 120 may also include other hardware or software components, depending on the functionality of the node, in some embodiments.

Memory 220 is representative of various types of possible computer system memory, including, but not limited to, static or dynamic RAM, such as DDR/DDR2, SDRAM, ECC SDRAM, EDO RAM, Rambus RAM, etc., or a non-volatile memory such as ROM, EEPROM, Flash, etc. Memory 220 may include other types of memory as well, or any combination of memory types.

In some embodiments, the functional elements of memory node 120 may be partitioned into more or fewer hardware or software components or all of the functionality may be included in a single component, such as a single integrated circuit chip or printed circuit board. For example, in some embodiments, memory 220 and memory controller 260 of memory node 120 may be included in the same physical component, such as in a dual in-line memory module (DIMM). In some embodiments, each memory controller 260 may be configured to keep track of which processor has allocated given portions of its memory. In other embodiments, one or more processors in one or more other nodes of network 100 may do this bookkeeping. In such embodiments, memory 220 may be accessed directly through network interface 250, rather than through memory controller 260. According to various embodiments, hardware (in memory node 120 or another node on network 100), software (executing on one or more processor nodes on network 100), or a combination of hardware and software may be used to keep track of which portions of memory 220 are allocated to which processors and processes.

In some embodiments, a single node, such as hybrid node 130, may include the functionality of both a processor node and a memory node. FIG. 2C illustrates one such node. In this example, hybrid node 130 includes a processor 210, a memory 220, a memory controller 260 configured to control access to memory 220, and a network interface 250 configured to connect hybrid node 130 to network 100. In one embodiment, such as the one illustrated by FIG. 2C, processor 210 may be connected to memory 220 through memory controller 260. In other embodiments, processor 210 may be directly connected to memory 220 via an integrated memory controller, or memory 220 may be integrated within processor 210, such as if memory 220 is an integrated cache memory. In some embodiments, network interface 250 may be configured to function as a relaying carrier, as described above.

Hybrid node 130 may also include other hardware or software components, depending on the functionality of the node, in some embodiments. In some embodiments, the functional elements of hybrid node 130 may be partitioned into more or fewer hardware or software components or all of the functionality may be included in a single component, such as a single integrated circuit chip or printed circuit board. For example, in some embodiments, memory 220 and memory controller 260 of hybrid node 130 may be included in the same physical component, such as in a dual in-line memory module (DIMM). In some embodiments, each memory controller 260 may be configured to keep track of which processor has allocated given portions of its memory. In other embodiments, this bookkeeping may be done by a processor 210 of hybrid node 130 or by one or more processors 210 of one or more other nodes of network 100. According to various embodiments, hardware (in hybrid node 130 or another node on network 100), software (executing on processor 210 of hybrid node 130 or on one or more other processors 210 of one or more other nodes on network 100), or a combination of hardware and software may be used to keep track of which portions of memory are allocated to which processors and processes. In some embodiments, memory 220 may be accessed directly by processor 210 or may be accessed by a processor on another node through network interface 250, rather than through memory controller 260.

In some embodiments, various other nodes 140 may be configured to implement mass storage devices (e.g., disk drives), peripherals, input/output devices (e.g., displays or terminal devices), or any other desired function. One or more processor nodes 110, memory nodes 120, or hybrid nodes 130, in other embodiments, may also implement these or any other additional functions.

As used herein, the term "memory carrier" may refer to any node that includes memory and/or a memory controller, such as memory nodes 120, hybrid nodes 130, or any other nodes 140 that include memory and/or a memory controller.

Figure 3:
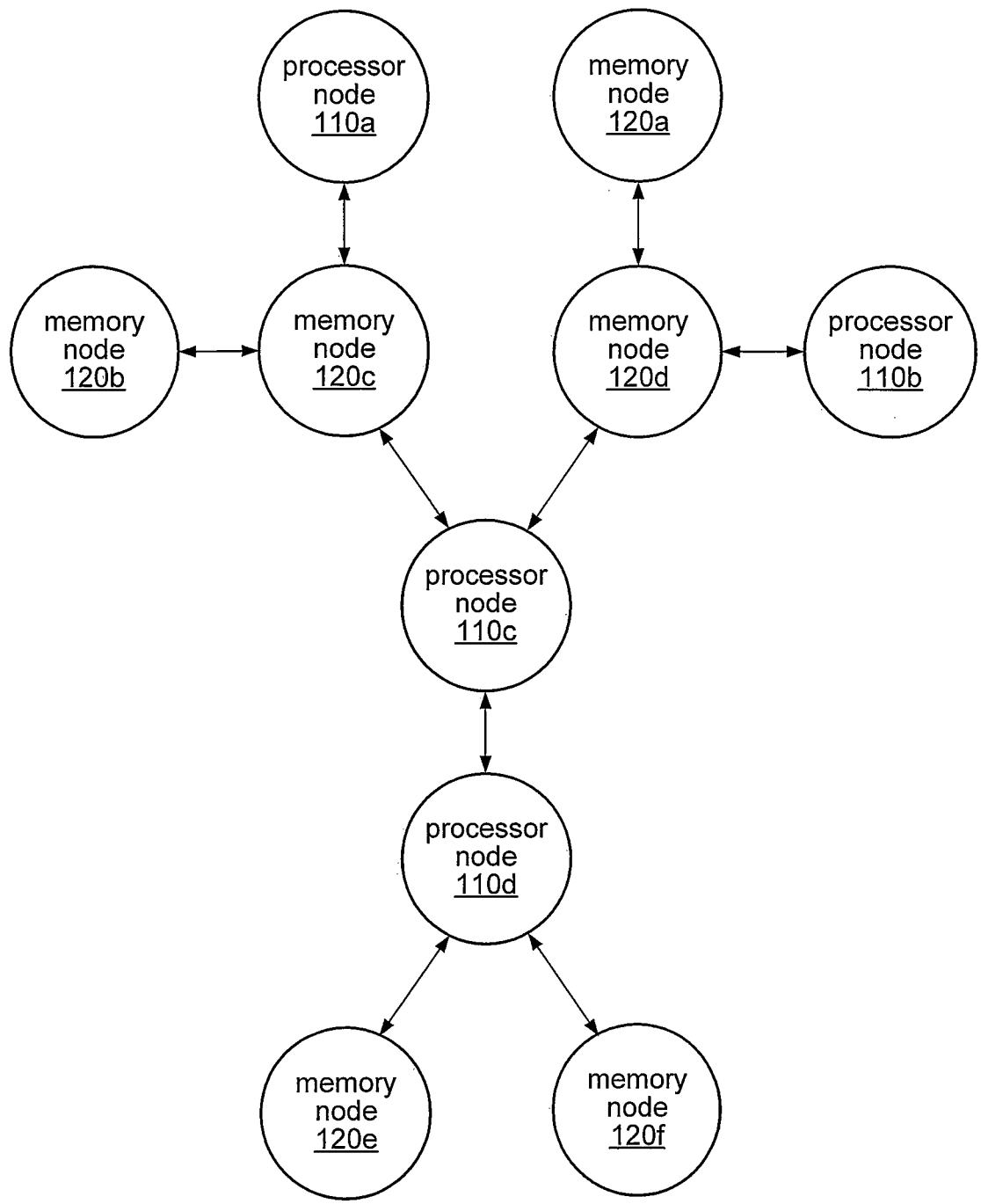
FIG. 3 illustrates one embodiment of a communication network suitable for implementation of a proximity-based memory allocation technique.

In a NUMA system, each processor node may be able to access memory locations on any node comprising shared memory. Proximity-based memory allocation may be employed in a NUMA system including any arbitrary network topology, through which the nodes are connected. Communication network 100 may be configured to interconnect various processor nodes 110, memory nodes 120, hybrid nodes 130 and other nodes 140. FIG. 3 illustrates one embodiment of a hierarchical tree topology connecting a plurality of processor nodes 110 and a plurality of memory nodes 120. Embodiments of a hierarchical tree topology may generally be distinguished from embodiments of a star topology in that a star topology typically includes a single, central "hub" node to which all other nodes are connected, while a tree topology may have two or more such "hub" nodes configured in a hierarchy. In some instances, star topologies may be subsets of tree topologies. According to various embodiments, network 100 may be configured as a tree or star topology connecting a single processor node 110 and multiple memory nodes 120, multiple processor nodes 110 and multiple memory nodes 120, one or more hybrid nodes 130, or any other combination of processor nodes 110, memory nodes 120, hybrid nodes 130 and/or other nodes 140.

Figure 4:
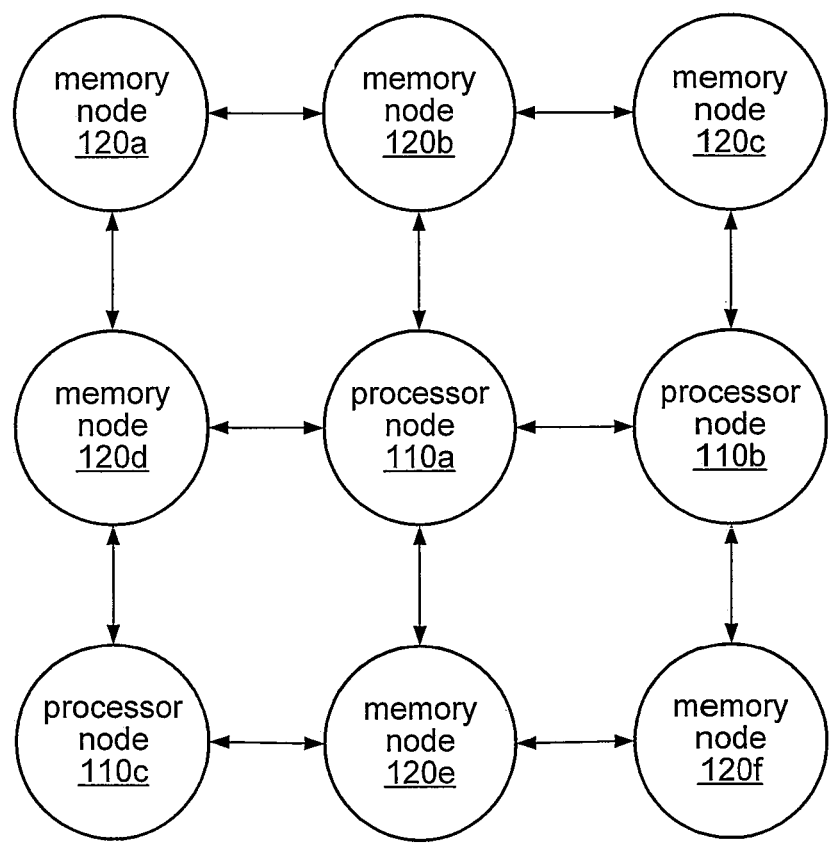
FIG. 4 illustrates a second embodiment of a communication network suitable for implementation of a proximity-based memory allocation technique.

Another embodiment of communication network 100 is illustrated by FIG. 4. In this example, a plurality of processor nodes 110 and a plurality of memory nodes 120 are connected via a grid topology. In one embodiment, a grid topology may include a two-dimensional network topology in which each node is connected to two neighboring nodes along each of one or more of the two dimensions. According to various embodiments, network 100 may be configured as a grid topology connecting a single processor node 110 and multiple memory nodes 120, multiple processor nodes 110 and multiple memory nodes 120, one or more hybrid nodes 130, or any other combination of processor nodes 110, memory nodes 120, hybrid nodes 130 and/or other nodes 140.

In various embodiments, network 100 may be configured as any network topology, including those described herein, or any other configuration of a single processor node 110 and multiple memory nodes 120; multiple processor nodes 110 and multiple memory nodes 120; one or more hybrid nodes 130; or any other combination of processor nodes 110, memory nodes 120, hybrid nodes 130 and/or other nodes 140. These configurations include, but are not limited to, a linear topology (in which connections are made only between each node and its neighbors in one dimension), a ring topology (similar to a linear topology, but in which the last node is connected to the first node), a torus topology (a multidimensional ring), a mesh topology (similar to a grid topology, but in which the last node on each row and/or column is connected to the first node of that row or column), a cube topology (similar to a grid, but in three dimensions) or a hypercube topology (in which multiple cube topologies are connected, such as with a fourth or higher dimension). In some embodiments, nodes connected via network 100 may have similar functionality to processor node 110, memory node 120, or hybrid node 130, but the functionality may be partitioned between nodes differently than in the examples described herein.

According to some embodiments, when a processor 110 connected to a communication network 100 requires some amount of memory for one of its processes, processor 110 may use a proximity-based memory allocation technique to find, and allocate to its process, the nearest and/or first memory node that can satisfy its request for memory. This proximity-based allocation technique may involve broadcasting a memory request packet to a subset of the nodes connected to network 100. As described above, the network interfaces 250 of the nodes connected to network 100 may implement the concept of time-to-live (TTL). In this case, a memory request packet may include a standard TTL field, which is decremented at each intermediate relaying node on the packet's way toward its final destination.

Figure 5:
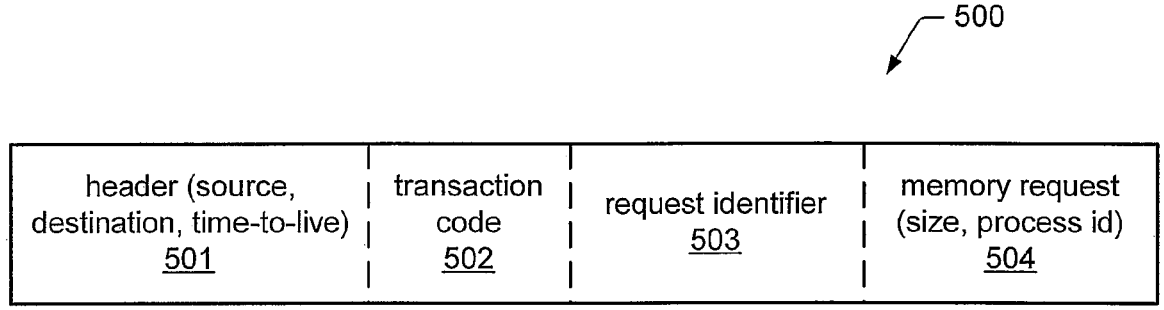
FIG. 5 illustrates the contents of an exemplary memory request packet, according to one embodiment.

One such embodiment is illustrated in FIG. 5 as memory request packet 500. In this example, the header 501 of memory request packet 500 may include a source address field and a destination address field, in addition to a time-to-live (TTL) field. Also shown in FIG. 5, the body of memory request packet 500 may include a transaction code field 502, a request identifier field 503, and one or more memory request fields 504 specifying details of the memory request (e.g., the process id associated with the memory request, the requested memory size, etc.). In some embodiments, the size of the request identification field 503 may be selected such that it is long enough that a wrap-around problem (one resulting in reuse of a single request identifier for two current processes) may be extremely unlikely to occur during any reasonable period of system operation. For example, if the entire physical memory space is P bytes, and the minimum memory allocation unit (or page size) is m bytes, selecting the length of the request identification field 503 in the packet body to be log (P/m) may prevent assignment of duplicate identifiers to two or more active processes. In other embodiments, the request identifier may include a portion representing the address or other identifier of the requesting processor, such as would be obtainable from the header 501 of request packet 500, so that requests from different processors may not be confused with one another. In other words, the actual request identifier may be the concatenation of a portion of the source address in packet header 501 and the request identifier field 503 in the packet body. In some embodiments, the processor may be configured such that it may not broadcast two different memory requests with the same request identifier. In some of these embodiments, the processor may record which memory allocations it has made, making it trivial for the processor to check the uniqueness of an identifier before including it in a new request packet 500.

In other embodiments, more, fewer or different fields may be included in the header or body of memory request packet 500, or similar fields may be partitioned differently between the packet header and body. In still other embodiments, information such as that included in request packet 500 may be partitioned into two or more packets, and these packets may be sent to one or more memory controllers at different times. For example, some details of the memory request, such as the process id, may not be sent to a memory controller until after memory has been allocated to that process.

In the example illustrated by FIG. 5, messages sent between a processor requesting memory and one or more memory controllers may be sent as unicast or broadcast messages, depending on the transaction code, as shown below in Table 1. According to some embodiments, if the transaction code indicates that the packet type is a broadcast message, the destination address may not be specified in the packet header, but if the transaction code indicates that the packet type is a unicast message, both the source and destination nodes may be specified in the packet header.

TABLE 1

| transaction code | operation | direction | packet type |
|---|---|---|---|
| 1 | request | from a processor to one or more memory controllers | broadcast |
| 2 | reply | from a single memory controller to a processor | unicast |

TABLE 1-continued

| transaction code | operation | direction | packet type |
|---|---|---|---|
| 3 | confirmation acknowledgement (ack) | from a processor to a single memory controller | unicast |
| 4 | rejection negative acknowledgement (nack) | from a processor to a single memory controller | unicast |

As used herein, the term "memory controller" may refer to any memory controller 260 of a memory node 120, a hybrid node 130, or any other memory carrier node. In some embodiments, a proximity-based allocation scheme may be viewed as a client/server model, in which memory controllers are the servers; processors, such as processors 210 of processor nodes 110 or hybrid nodes 130, are the clients; and the service requests are demands for different amounts of physical memory. One embodiment of a proximity-based memory allocation technique is illustrated by the flow chart in FIG. 6. In this example, when a processor requires a block of physical memory, it may conduct a memory search with an ever-increasing search radius, until the requirement can be fulfilled.

To begin the memory search, a processor may set the search radius to one, assign a unique identifier to the request, and set a timeout parameter (tout) to an initial timeout value, t0, as shown in block 610. In some embodiments, this initial timeout value is a system-wide constant, T. One method for selecting an appropriate value for a system-wide constant, T, is described later.

In some embodiments, a memory request packet may be assembled that includes a packet header and a packet body, as illustrated by request packet 500 of FIG. 5. In other embodiments, more, fewer, or different fields may be included in the memory request packet, or similar information may be partitioned differently between the packet header and body or between two or more packets.

In this example, the processor may broadcast a request for memory, including the packet header described above, with the TTL field set to the search radius, as shown in block 620. The initial memory request packet header may, in some embodiments, also include a source address (e.g., the address of the requesting processor node). In some embodiments, the packet body may include a transaction code as shown in Table 1 (in this case, transaction code 1, indicating a broadcast memory request message from the processor to one or more memory controllers) and memory request details, including the amount of memory requested. In various embodiments, since the transaction code indicates that the packet type is a broadcast message, the destination address may or may not be specified in the packet header. The memory request may be broadcast only to the subset of nodes that are removed from the processor by the number of network hops equal to the value of the search radius, in some embodiments. In other embodiments, the memory request may be broadcast to the subset of nodes that are removed from the processor by no more than the value of the search radius, that is, to nodes at that number of network hops away or fewer. One method for broadcasting to a subset of nodes in a computer system is described in greater detail below.

The processor may start a timer, set to the initial timeout value described above, as illustrated by block 630. In this example, the processor may then wait for a reply from a node that can satisfy its request for memory. In some embodiments, a reply from a node that can satisfy the request may include an identifier that matches the request identifier in the initial memory request packet body.

In this example, the processor may or may not receive a reply from a memory node indicating that it can satisfy the request, as shown in block 640. If the processor does not receive a reply with an identifier matching the memory request identifier before the timer times out, the processor may increase the search radius and the timeout value, as illustrated by block 645, and then repeat the search beginning by broadcasting the memory request packet to another subset of nodes, as shown in block 620. In this example, the search radius is increased by one network hop for each iteration of the search. In other embodiments, the search radius may be increased by some other number of network hops. In some embodiments, all of the nodes previously broadcast to may be broadcast to again. In other embodiments, only nodes that are removed from the requesting processor by the new search radius may be broadcast to. As illustrated in block 645, the processor may increase the timeout value by a fixed amount for each iteration of the search, according to different embodiments. In some embodiments, this fixed amount is equal to the system-wide constant, T, referred to above, which may also be used as the initial timeout value. Choosing an appropriate value for T, may, in some embodiments, result in identifying the nearest available memory controller with the least overall response delay (e.g., communication delay plus processing delay). In some embodiments, the value of T may be chosen based on the configuration of the nodes in network 100. For example, in a regularly patterned configuration of nodes, the value of T may be chosen such that incrementing the timeout value by T for each iteration of the memory search may provide reasonable certainty that an additional set of nodes may receive, and have an opportunity to respond to, the memory request before the timeout.

If, at block 640 of this example, the processor receives a first reply from a node Y that includes an identifier matching the memory request identifier, the processor may send an acknowledgement (ack) in the form of a confirmation packet back to node Y, as illustrated by block 650. In some embodiments, this confirmation packet may include the same request identifier as the initial memory request packet body. The confirmation packet may be in the same format as the initial memory request packet, in some embodiments. In these embodiments, the packet header may include a source address (the address of the requesting processor node) and a destination address (the address of node Y), and the packet body may include a transaction code as shown in Table 1 (transaction code 3, indicating a unicast "ack" message from the processor to a single memory controller). The packet header may also include a TTL field, in some embodiments. This TTL field may be set to the maximum value for the network, in some embodiments. In other embodiments, it may be set to a value representing a number of network hops between the processor and node Y or to some other value. One method for determining a number of hops between a requesting processor and a replying node is described later.

In this example, the processor may or may not receive a reply from one or more other memory nodes indicating that they can satisfy its memory request, as illustrated by block 660. In some embodiments, if the processor does not receive another reply with an identifier matching that of the memory request, the memory allocation may be complete, as in block 670.

If, on the other hand, one or more additional nodes reply to the processor including an identifier matching that of the memory request, the processor may send a negative acknowledgement ("nack") packet to each of these additional nodes, as illustrated by block 665. In some embodiments, these "nack" packets may include the same request identifier as the initial memory request packet body. Each nack packet may be in the same format as the initial memory request packet, in some embodiments. In these embodiments, each packet header may include a source address (the address of the requesting processor node) and a destination address (the address of one of the additional nodes), and the packet body may include a transaction code as shown in Table 1 (transaction code 4, indicating a unicast "nack" message from the processor to a single memory controller). The packet header may also include a TTL field, in some embodiments. This TTL field may be set to the maximum value for the network, in some embodiments. In other embodiments, it may be set to a value representing a number of network hops between the processor and the destination node or to some other value.

In some embodiments, if the processor receives a reply from two or more nodes indicating that each can satisfy the memory request, the processor may select one of the nodes and send an acknowledgement packet to the selected node. In these embodiments, the processor may send a "nack" packet to each of the replying nodes other than the selected node. The selection may be based on any criteria, including, but not limited to, the order in which the replies were received and a true hop count between the processor and the replying memory nodes, according to different embodiments. For example, a memory node corresponding to a later-arriving reply having a lower hop count may be selected over a memory node corresponding to an earlier-arriving reply having a higher hop count, in some embodiments. An embodiment in which a true hop count between the processor and one or more replying memory nodes may be determined is described later.

Figure 7:
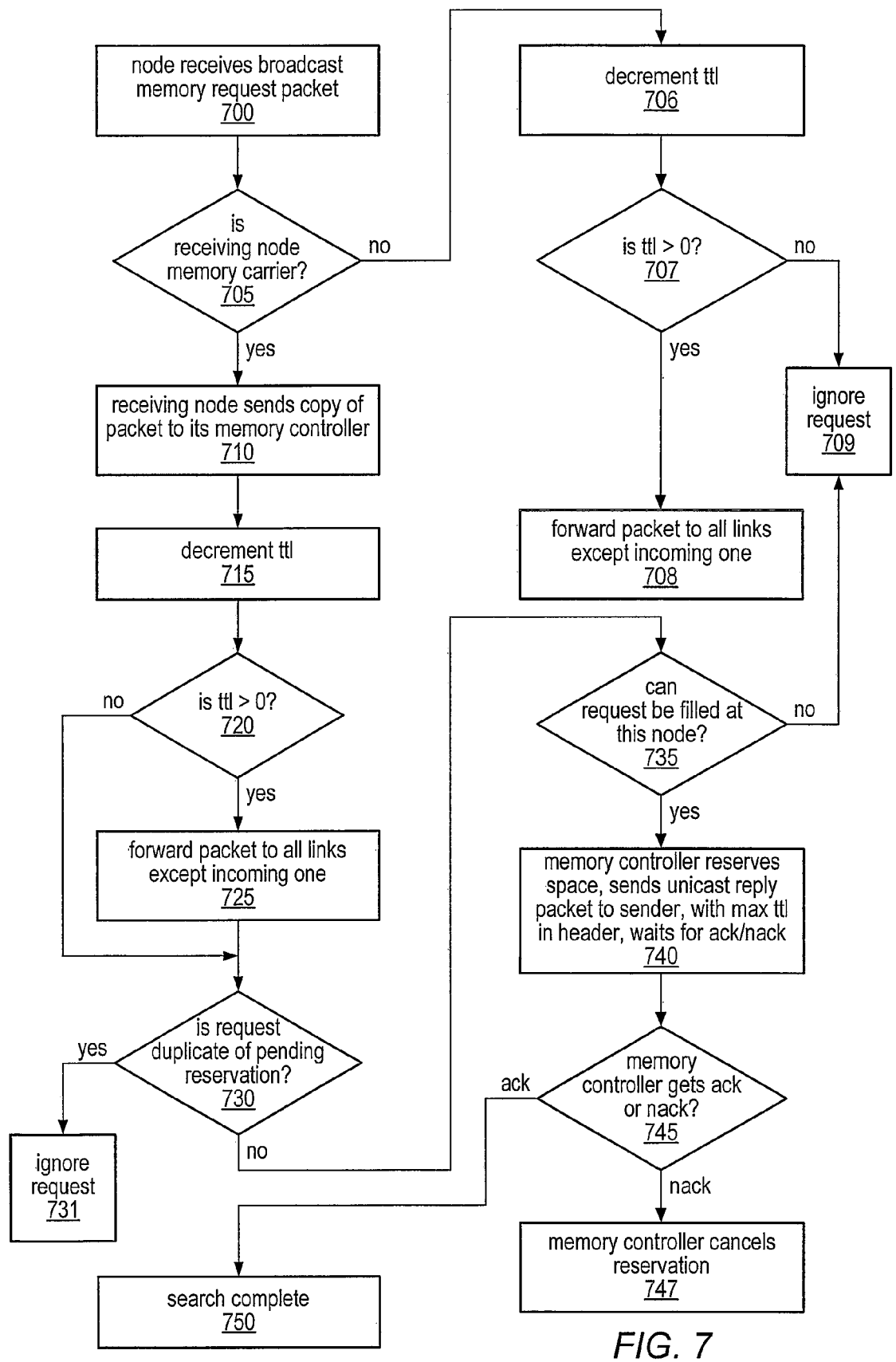
FIG. 7 is a flowchart illustrating one embodiment of a method for allocating memory according to a proximity-based allocation technique.

In one embodiment, illustrated by the flowchart of FIG. 7, a node receiving a broadcast memory request (also referred to as a "receiving node") may reply to the request itself, may forward the request to other nodes, or may ignore the request. In this example, a node may receive a broadcast memory request packet, such as memory request packet 500, as shown in block 700. In one embodiment, the memory request packet header may include a TTL value and a source address (the address of the requesting processor node), and the packet body may include a transaction code, such as shown in Table 1 (in this case, transaction code 1, indicating a broadcast memory request message from the processor to one or more memory controllers). In some embodiments, since the transaction code indicates that the packet type is a broadcast message, the destination address may or may not be specified in the packet header. In some embodiments, the packet body may specify the amount of memory requested.

A receiving node may respond differently to a received memory request depending on if it is a memory carrier or not, as illustrated by block 705. In this example, if the receiving node is not a memory carrier, it may respond by decrementing the TTL value of the memory request packet, as in block 706.

After decrementing the TTL value, in this example, the receiving node may determine if the TTL value is greater than zero, as in block 707. If the TTL value is not greater than zero, the packet has traveled its maximum allowed number of network hops and the receiving node may not forward it to any other nodes. In this case, the receiving node may ignore the request, as illustrated by block 709.

If, on the other hand, the decremented TTL value is greater than zero, the receiving node may be configured to forward the memory request packet to other nodes, such as in embodiments in which the network interface of the receiving node functions as a relaying carrier. For example, block 708 describes the receiving node forwarding the packet to all of its links in the communication network except for the one from which it received the request packet.

If the receiving node is a memory carrier, the node may, in some embodiments, send a copy of the memory request packet to its memory controller, as shown in block 710. In this example, the memory controller may then analyze the memory request packet to see if it can satisfy the request. Similar to the case in which the receiving node is not a memory carrier, the receiving node may first decrement the TTL value of the memory request packet, as in block 715.

After decrementing the TTL value, the receiving node may determine whether or not the decremented TTL value is greater than zero, as illustrated by block 720 in this example. In some embodiments, if the TTL value is not greater than zero, the packet has traveled its maximum allowed number of network hops and the receiving node may not forward it to any other nodes before continuing with its analysis.

If, on the other hand, the decremented TTL value is greater than zero, the receiving node may be configured to forward the memory request packet to other nodes before continuing with its analysis. For example, block 725 describes the receiving node forwarding the packet to each of its links in the communication network except for the one from which it received the request packet. In some embodiments, the operations illustrated by blocks 715-725 may be performed in parallel to those illustrated by blocks 730-747, rather than previous to these operations. For example, determining if a memory request can be filled and allocating memory to a process may be implemented by a separate hardware or software module of the memory controller than relaying the memory request packet to additional nodes.

The receiving node, if it is a memory carrier, may determine if the memory request is a duplicate of a pending (previously received) request for which the node has reserved at least the requested amount of memory, as illustrated by block 730. In some embodiments, if the memory request is a duplicate of a previously received request for which the node has reserved a portion of memory, the receiving node may be configured to ignore the request, as illustrated by block 731 in this example.

If the memory request is not a duplicate of a previously received request for which the node has reserved a portion of memory, the receiving node may determine if it can satisfy the memory request, as shown in block 735. In some embodiments, if the receiving node cannot satisfy the request (e.g., if the receiving node does not include an available portion of memory at least as large as the amount of memory requested), the receiving node may ignore the request, as in block 709.

If, in some embodiments, the receiving node determines that it can satisfy the memory request, the receiving node may respond by reserving a portion of memory at least as large as the amount of memory requested, sending a unicast reply packet to the requesting node, and waiting for an acknowledgement, as described by block 740. In some embodiments the actual amount of memory reserved may depend on the configuration of the memory itself, such as if it may only be allocated in blocks of certain predetermined sizes. In some embodiments, the reply may be a packet in the same format as the initial memory request packet. In these embodiments, the packet header may include a source address (the address of the receiving node), a destination address (the address of the requesting processor node), and a TTL value, and the packet body may include a transaction code as shown in Table 1. In this example, the transaction code value would be 2, indicating a unicast reply from a single memory controller to the processor. In some embodiments, the TTL field of the reply may be set to the maximum TTL value for the network. In other embodiments, the TTL field may be set to a value representing an actual number of network hops between the receiving node and the processor or to some other value. Reserving a portion of memory may, in some embodiments, involve updating a registry or table indicating which portions of memory are available and which are currently allocated to various processes. For example, the request identifier, process id, and/or an identifier of the requesting processor may be recorded in the registry along with the amount of memory reserved and the starting and/or ending address of the memory reserved. In some embodiments, such a registry may be local to the memory controller or stored in the physical memory itself, or it may be located elsewhere, such as on another node connected to network 100.

Once the receiving node has reserved a portion of memory and replied to the requesting processor node, it may, in some embodiments, be configured to wait for an acknowledgement from the processor indicating that its memory will be allocated to the process for which the processor requested memory. In some embodiments, the receiving node may receive an acknowledgement packet or a negative acknowledgement packet from the processor, as illustrated by block 745. If the receiving node receives an acknowledgement packet, it may be in the same format as the initial memory request packet, and may include the elements described above for the acknowledgement (or "ack") packet sent from the processor. In some embodiments, once the receiving node receives an acknowledgement, the reserved memory is allocated to the requesting processor and the memory allocation is complete, as in block 750.

If the receiving node does not receive an acknowledgement from the processor, it may, in some embodiments, receive a negative acknowledgement (or "nack") from the processor. In this example, the negative acknowledgement packet may be in the same format as the initial memory request packet, and may include the elements described above for the negative acknowledgement ("nack") packet sent from the processor.

In some embodiments, if the receiving node receives a nack packet from the processor, the receiving node is configured to respond by canceling the reservation of memory corresponding to the initial memory request, as in block 747. In one embodiment, canceling the reservation may involve updating a registry or table indicating which portions of memory are available and which are currently allocated to various processes, as described above.

In some embodiments, if a processor wants to release previously allocated physical memory for any reason, it may send a reject nack in a unicast packet, with the original request identifier, back to the corresponding memory controller of the memory that was allocated. In such embodiments, the receiving node, upon receiving the nack packet, may cancel the reservation and free that portion of memory for use by other processes, as described above.

To further illustrate proximity-base memory allocation, two examples of proximity-based memory allocation are described in detail below. The first example is based on the hierarchical tree topology illustrated in FIG. 3. For this example, Table 2 (below) lists the amount of memory available on each node of the network illustrated in FIG. 3 at the time when one of the processor nodes 110 determines that one of its processes requires a block of memory.

TABLE 2

| | memory node | | | | | |
|---|---|---|---|---|---|---|
| | 120a | 120b | 120c | 120d | 120e | 120f |
| available memory | 11 Mb | 1 Mb | 2 Mb | 3 Mb | 0 Mb | 9 Mb |

In this example, one of the processes executing on processor node 110c requires an allocation of 10 Mb of memory. According to some embodiments, such as the ones discussed above and illustrated in FIGS. 6 and 7, processor 210 of processor node 110c may broadcast a memory request packet, such as memory request packet 500, in which TTL equals 1 and the timeout field is set to an initial timeout value, t0. Because the search radius is one network hop removed from processor node 110c, this first broadcast packet reaches memory node 120c, memory node 120d, and processor node 110d. In this example, none of these nodes can satisfy the request for 10 Mb of memory, and processor 110c times out before receiving a reply.

In this example, processor 210 of processor node 110c may send a second broadcast packet in which TTL equals 2 and the timeout value is larger than the initial timeout value. Because the search radius is now two network hops removed from processor node 110c, this second broadcast packet again reaches memory node 120c, memory node 120d, and processor node 110d, and also reaches processor node 110a, memory node 120a, memory node 120b, processor node 110b, memory node 120e, and memory node 120f. In this example, memory node 120a can satisfy the request, so memory node 120a reserves at least 10 Mb of memory and sends a reply to processor node 110c including the request identifier from the memory request packet. Processor node 110c then sends an ack unicast packet to memory node 120a. Since no other nodes replied to the memory request, no nack packets are sent by processor node 110c.

A second example of proximity-based memory allocation is based on the grid topology illustrated in FIG. 4. For this example, Table 3 (below) lists the amount of memory available on each node of the network illustrated in FIG. 4 at the time when one of the processors determines that it needs to allocate a block of memory to one of its processes.

TABLE 3

| | memory node | | | | | |
|---|---|---|---|---|---|---|
| | 120a | 120b | 120c | 120d | 120e | 120f |
| available memory | 12 Mb | 0 Mb | 0 Mb | 0 Mb | 4 Mb | 0 Mb |

In this example, one of the processes executing on processor node 110a requires an allocation of 10 Mb of memory. According to some embodiments, such as the ones described by FIGS. 6 and 7, processor node 110a may broadcast a memory request packet, such as memory request packet 500, in which TTL equals 1 and the timeout field is set to an initial timeout value, t0. Because the search radius is one network hop removed from processor node 110a, this first broadcast packet reaches memory node 120b, memory node 120d, memory node 120e, and processor node 110b. In this example, none of these nodes can satisfy the request for 10 Mb of memory, and processor node 110a times out before receiving a reply.

In this example, processor node 110a may then send a second broadcast packet in which TTL equals 2 and the timeout value is larger than the initial timeout value. Because the search radius is now two network hops removed from processor node 110a, this second broadcast packet again reaches memory node 120b, memory node 120d, memory node 120e, and processor node 110b, and also reaches memory node 120a, memory node 120c, processor node 110c, and memory node 120f.

In this example, memory node 120a can satisfy the request, so memory node 120a reserves at least 10 Mb of memory and sends a reply to processor node 110a including the request identifier from the memory request packet. Processor node 110a then sends an ack unicast packet to memory node 120a. Since no other nodes replied to the memory request, no nack packets are sent by processor node 110a.

Other embodiments of proximity-based memory allocation may include variations of the search described above and illustrated by FIGS. 6 and 7. For example, in some embodiments, instead of relying on a time-to-live (TTL) value, a requesting processor may send out a broadcast memory request and relaying carriers may forward it without regard to a TTL value. This may result in a larger number of request, reply, acknowledgement, and/or negative acknowledgement packets being sent between nodes, in some embodiments. In such embodiments, the requesting processor may receive multiple favorable replies from nodes at varying numbers of network hops away. In these cases, the requesting processor may select a memory to allocate to its process based on the order of the replies received, the number of network hops between the requesting processor and each of the replying nodes, or on some other criteria. The processor may send an ack unicast packet to the selected node and may send a nack unicast packet to each of the other replying nodes, in some embodiments.

Figure 6:
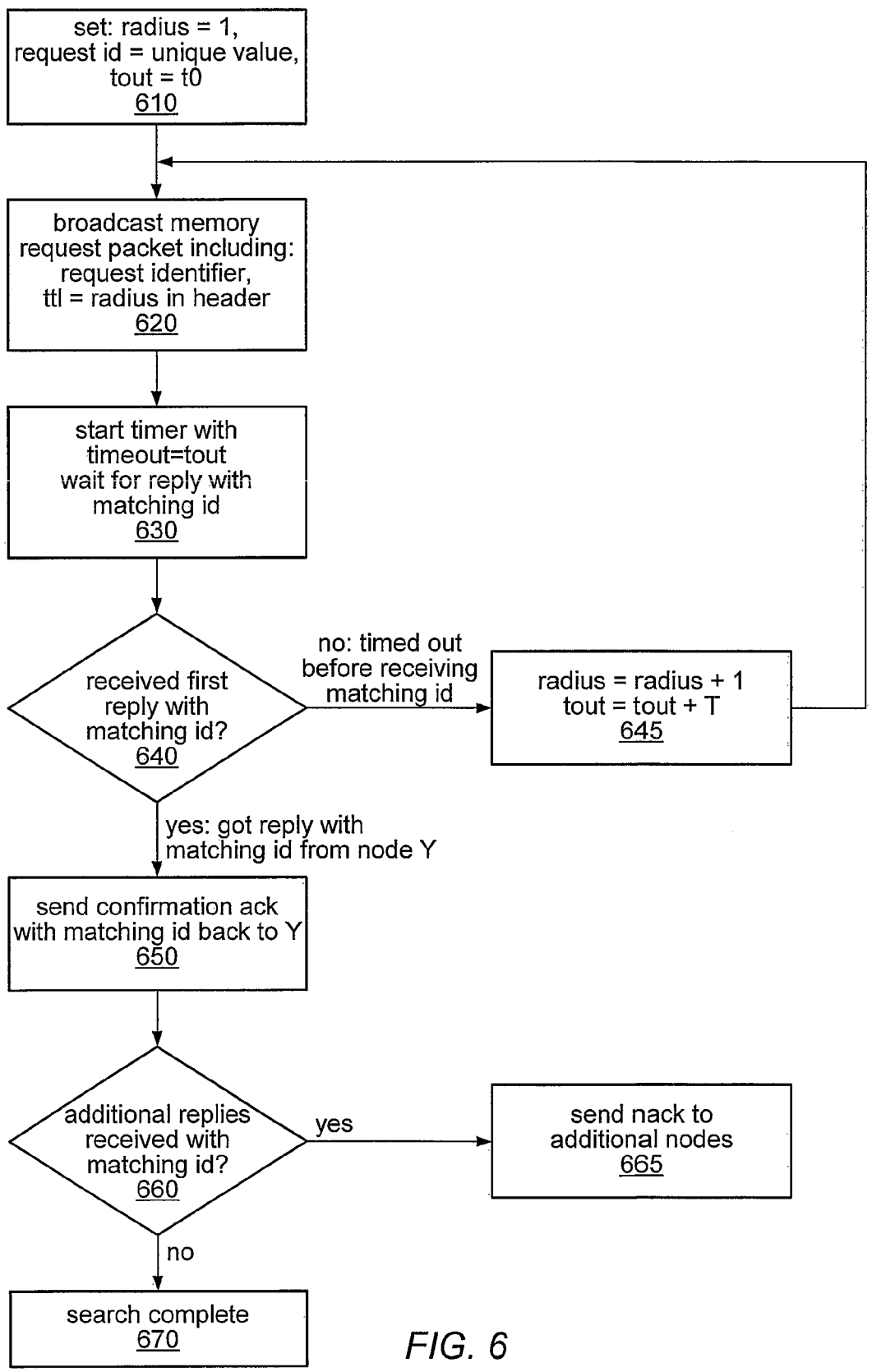
FIG. 6 is a flowchart illustrating one embodiment of a proximity-based memory allocation technique.
Figure 8:
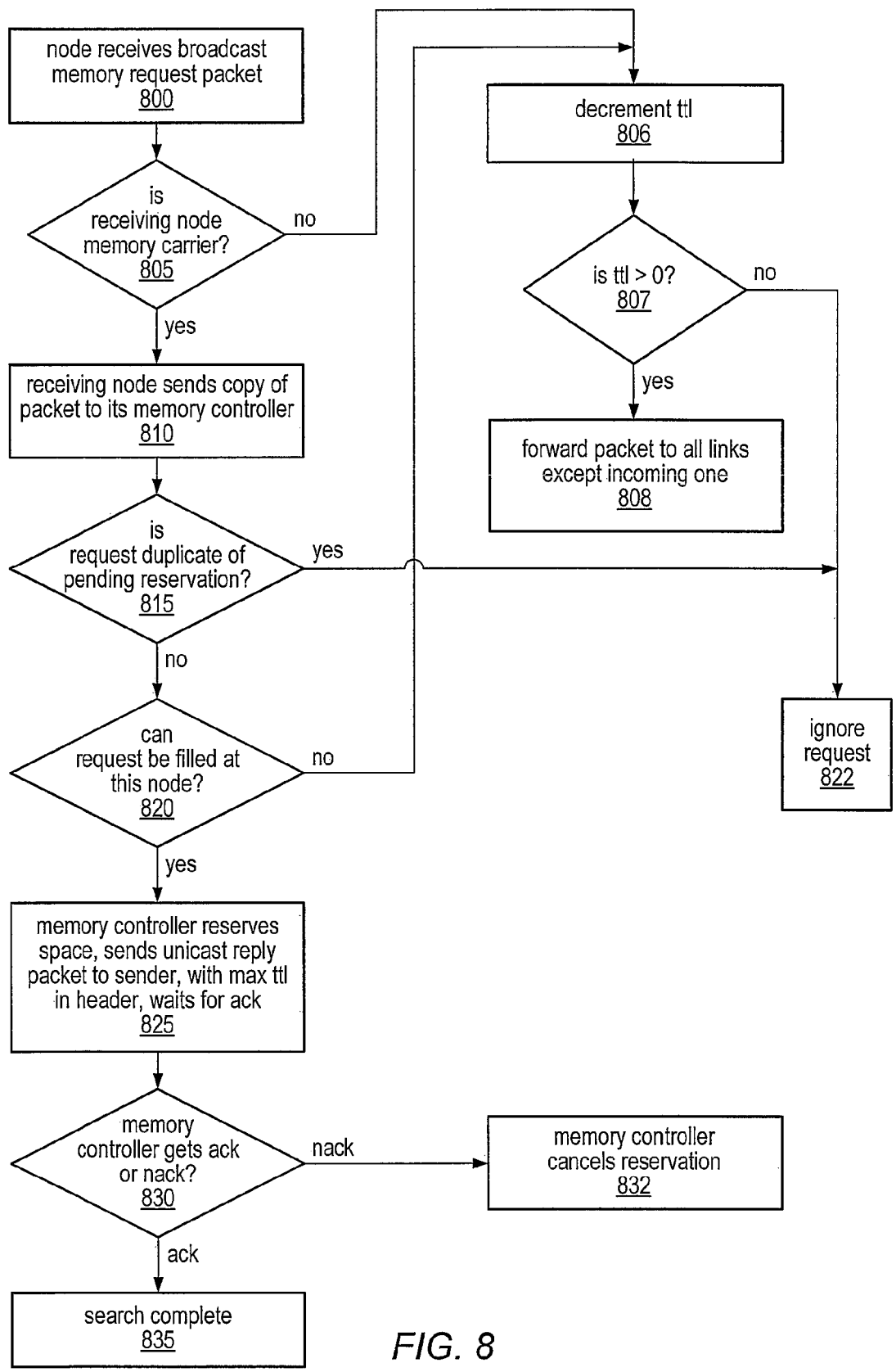
FIG. 8 is a flowchart illustrating a second embodiment of a method for allocating memory according to a proximity-based allocation technique.

In other embodiments, the total number of request packets sent between nodes may be less than the number of packets generated by the embodiment illustrated by FIGS. 6 and 7. For example, in one embodiment, a receiving node that is capable of satisfying a received memory request may refrain from forwarding the request packet to other nodes. One such embodiment is illustrated by FIG. 8 and described below.

In this example, a node may receive a broadcast memory request packet, such as memory request packet 500, as shown in block 800. In one embodiment, the memory request packet header may include a TTL value and a source address (the address of the requesting processor node), and the packet body may include a transaction code, such as shown in Table 1 (in this case, transaction code 1, indicating a broadcast memory request message from the processor to one or more memory controllers). In some embodiments, since the transaction code indicates that the packet type is a broadcast message, the destination address may or may not be specified in the packet header. In some embodiments, the packet body may specify the amount of memory requested.

A receiving node may respond differently to the request depending on if it is a memory carrier or not, as illustrated by block 805. In this example, if the receiving node is not a memory carrier, it may respond by decrementing the TTL value of the memory request packet, as in block 806.

After decrementing the TTL value, in this example, the receiving node may determine if the TTL value is greater than zero, as in block 807. If the TTL value is not greater than zero, the packet has traveled its maximum allowed number of network hops and the receiving node may not forward it to any other nodes. In this case, the receiving node may ignore the request, as illustrated by block 822.

If, on the other hand, the decremented TTL value is greater than zero, the receiving node may be configured to forward the memory request packet to other nodes. For example, block 808 describes the receiving node forwarding the packet to all of its links in the communication network except for the one from which it received the request packet.

If the receiving node is a memory carrier, that is, if it includes memory and/or a memory controller, the node may, in some embodiments, analyze the memory request packet to see if it may satisfy the request. In this example, unlike the case in which the receiving node is not a memory carrier, the receiving node may first send a copy of the request packet to its memory controller, as described by block 810.

The receiving node, if it is a memory carrier, may determine if the memory request is a duplicate of a pending (previously received) request for which the node has reserved at least the requested amount of memory, as illustrated by block 815. In some embodiments, if the memory request is a duplicate of a previously received request for which the node has reserved a portion of memory, the receiving node may be configured to ignore the request, as illustrated by block 822.

If the memory request is not a duplicate of a previously received request for which the node has reserved a portion of memory, the receiving node may determine if it can satisfy the memory request, as shown in block 820. In some embodiments, if the receiving node cannot satisfy the request, that is, if the receiving node does not include an available portion of memory at least as large as the amount of memory requested, the receiving node may respond by determining whether to forward the request to additional nodes. Determining whether to forward the request may, in some embodiments, involve decrementing the TTL value of the memory request packet, as shown in block 806.

After decrementing the TTL value, the receiving node may determine whether or not the decremented TTL value is greater than zero, as illustrated by block 807. In some embodiments, if the TTL value is not greater than zero, the packet has traveled its maximum allowed number of network hops and the receiving node may not forward it to any other nodes. In this case, the receiving node may ignore the request, as illustrated by block 822.

If, on the other hand, the decremented TTL value is greater than zero, the receiving node may be configured to forward the memory request packet to other nodes. For example, block 808 describes the receiving node forwarding the packet to all of its links in the communication network except for the one from which it received the request packet.

If, in some embodiments, the receiving node determines that it can satisfy the memory request, the receiving node may respond by reserving a portion of memory at least as large as the amount of memory requested, sending a unicast reply packet to the requesting node, and waiting for an acknowledgement, as described by block 825. In some embodiments the actual amount of memory reserved may depend on the configuration of the memory itself, such as if it may only be allocated in blocks of certain predetermined sizes. In some embodiments, the reply may be a packet in the same format as the initial memory request packet. In these embodiments, the packet header may include a source address (the address of the receiving node), a destination address (the address of the requesting processor node), and a TTL value, and the packet body may include a transaction code as shown in Table 1. In this example, the transaction code value would be 2, indicating a unicast reply from a single memory controller to the processor. In some embodiments, the TTL field of the reply may be set to the maximum TTL value for the network. In other embodiments, the TTL field may be set to a value representing an actual number of network hops between the receiving node and the processor or to some other value. In some embodiments, reserving a portion of memory may involve updating a registry or table indicating which portions of memory are available and which are currently allocated to various processes, as described above.

Once the receiving node has reserved a portion of memory and replied to the requesting processor node, it may, in some embodiments, be configured to wait for acknowledgement from the processor indicating that its memory will be allocated to the process for which the processor requested memory. In some embodiments, the receiving node may receive an acknowledgement packet or a negative acknowledgement packet from the processor, as illustrated by block 830. If the receiving node receives an acknowledgement packet, it may be in the same format as the initial memory request packet, and may include the elements described above for the acknowledgement (or "ack") packet sent from the processor. In some embodiments, once the receiving node receives an acknowledgement, the reserved memory may be allocated to the requesting processor and the memory allocation may be complete, as in block 835.

If the receiving node does not receive an acknowledgement from the processor, it may, in some embodiments, receive a negative acknowledgement (or "nack") from the processor. In this example, the negative acknowledgement packet may be in the same format as the initial memory request packet, and may include the elements described above for the negative acknowledgement ("nack") packet sent from the processor.

In some embodiments, if the receiving node receives a nack packet from the processor, the receiving node may be configured to respond by canceling the reservation of the memory corresponding to the initial memory request, as in block 832. Canceling the reservation may, in some embodiments, involve updating a registry or table indicating which portions of memory are available and which are currently allocated to various processes, as described above.

In one embodiment, a requesting processor may be configured to determine a true hop count between itself and a receiving node that is capable of satisfying the processor's memory request. In one such embodiment, the reply packet from the receiving node to the requesting processor, when sent, may include the TTL field set to the maximum value for the system. In this example, the TTL value may be decremented by each relaying node as the packet travels from the receiving node to the requesting processor. Therefore, the requesting processor may be able to determine a hop count between the receiving node and the requesting processor by examining the value of the TTL field when it receives the reply. In this example, the hop count may be the difference between the maximum TTL value for the system and the value remaining in the TTL field when the requesting processor receives the packet. In another embodiment, the reply packet from the receiving node, when sent, may include the TTL field set to zero. In this example, the TTL value may be incremented by each relaying node as the packet travels from the receiving node to the requesting processor. Therefore, the requesting processor may be able to determine a hop count between the receiving node and the requesting processor by examining the value of the TTL field, which will correspond to the number of hops traveled.

In some embodiments, there may be more than one path from the requesting processor to a receiving node; therefore there may be two or more possible hop count values for a message traveling from the receiving node to the requesting node and vice versa. In some embodiments, the requesting processor may select which memory to allocate to its process by choosing the memory corresponding to the reply that traveled the fewest hops from among multiple replies received within its timeout period. An embodiment such as this may be used to find the closest memory with the least communication-only delay.

Proximity-based memory allocation, as described herein, may be applied to computer systems with memory architectures other than the distributed, shared memory (DSM) system described above. For example, in some embodiments, a virtual shared memory may be overlaid on top of a distributed architecture. In this example, a virtual address of a block of memory may be translated into the physical address of a block of memory that is allocated to a process. In some cases, the physical block of memory may be non-local memory (e.g., it may be implemented on a node other than the one including the requesting processor). In other cases, the physical block of memory allocated may be local to the requesting processor. In some embodiments, the virtual address of the allocated memory may correspond to an address assigned to the address space of the requesting processor, whether the physical memory is local or non-local to the requesting processor.

In some embodiments, if a processor's request for memory cannot be fulfilled by any memory controller (i.e., none of the memory controllers have enough free space to satisfy the request), the processor may be configured to break up its memory request into multiple requests for smaller blocks of memory and to issue memory requests for each of these smaller blocks of memory using a proximity-based memory allocation technique, as described herein.

In some embodiments, the nodes of a NUMA shared memory multiprocessor computer system may be configured to detect or respond to various error conditions. For example, in one embodiment, if a processor fails after allocating memory on another node, or a memory controller fails after reserving memory for a processor, the recovering entity (either the processor or the memory controller) may be configured to broadcast a special "rebooting" message to all of the nodes in the system, so that stale memory allocations or reservations may be discarded or canceled. In some embodiments, such a "rebooting" message may only be unicast to the affected nodes of the system.

In another embodiment, a heartbeat protocol may be maintained between each pair of allocation clients (in this case, memory controllers) and servers (requesting processors). For example, a heartbeat packet may be unicast back and forth between each pair of allocation clients and servers at predefined intervals. In such embodiments, failures may be detected in a timely manner if the heartbeat protocol between any pair is interrupted.

In yet another embodiment, a version number may be embedded within the request identifier described above. In this case, if a receiving node receives a request packet in which the request identifier is the same as the request identifier of a previously received request packet except that it includes a new version number, the receiving node may determine that an error condition has occurred. If the receiving node determines that an error condition has occurred, it may be configured to cancel all memory reservations corresponding to the previous request that included an older version number.

A system employing proximity-based memory allocation, but having a less than reliable underlying transport layer, may apply a reservation protocol involving a four-way handshake, as described in more detail below. In such a system, the reservation protocol may involve a requesting processor creating an interaction structure for each memory allocation request that is used for maintaining interaction with a remote memory controller (i.e., with a memory controller on a remote memory node that has indicated it can satisfy the memory allocation request.) In one embodiment, the interaction structure may include the elements illustrated in FIG. 9A: a unique request identifier 901, a state indicator 902, a radius 904 (e.g., a time-to-live value), a timeout timer 905, and a timeout value 903.

In the interaction structure illustrated in FIG. 9A, the state indicator value may be one of "OPEN", "CONTACT", "CONNECT", or "CLOSE", as described in more detail later. The radius value (or TTL value) may be used when searching for the nearest memory node using broadcast packets, according to the methods described above, and may be initially set to a value of 1 or to a minimum search radius, in various embodiments. In this example, the timeout value may always be equal to the value in the radius (or TTL) field times a constant T, where the constant T is dependent on the maximum transmission delay plus any processing delay for a one-hop packet transfer.

As previously noted, the memory controller for a responding memory node may in some embodiments create a registry or table indicating which portions of memory are available and which are currently allocated to various processes. In some embodiments, this registry or table may include an interaction structure for each memory allocation request similar to that of the processor node, but simpler, such as the one illustrated in FIG. 9B. In this example, the interaction structure may include the unique request identifier 951, a state indicator 952, a timeout value 953, and a timeout timer 955. In some embodiments, the allowable state indicator values may be the same as those in the processor's interaction structure, while in other embodiments the memory controller's states may be different from those of the processor node. Similarly, in different embodiments the timeout value of the memory controller's interaction structure may correspond to the TTL value contained in the memory allocation request packet received or may correspond to a different timeout value for the memory controller's state machine.

A system employing the reservation protocol described herein may include more transaction types than one in which a reliable transport layer is assumed. For example, such a protocol may involve the transaction types illustrated in Table 4 below.

TABLE 4

| transaction code | operation | direction | packet type |
|---|---|---|---|
| 1 | memory allocation request | from a processor to one or more memory controllers | broadcast |
| 2 | memory reservation acknowledgement (reserve ack) | from a single memory controller to a processor | unicast |
| 3 | confirmation acknowledgement (confirm ack) | from a processor to a single memory controller | unicast |
| 4 | commit | from a single memory controller to a processor | unicast |

TABLE 4-continued

| transaction code | operation | direction | packet type |
|---|---|---|---|
| 5 | read request | from a processor to a single memory controller | unicast |
| 6 | read acknowledgement (read ack) | from a single memory controller to a processor | unicast |
| 7 | write request | from a processor to a single memory controller | unicast |
| 8 | write acknowledgement (write ack) | from a single memory controller to a processor | unicast |
| 9 | reject negative acknowledgement (reject nack) | from a processor to a single memory controller | unicast |
| 10 | reject acknowledgement (reject ack) | from a single memory controller to a processor | unicast |
| 11 | reject confirmation (reject confirm) | from a processor to a single memory controller | unicast |

Figure 9A:
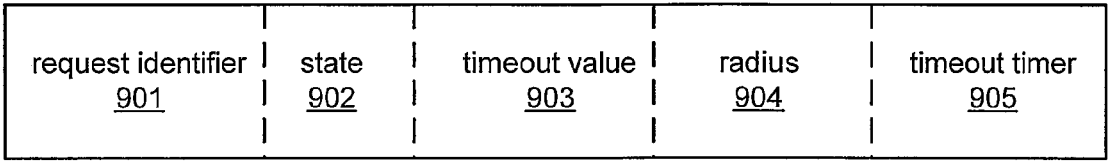
FIGS. 9A and 9B illustrate an interaction structure for a processor and an interaction structure for a memory node, respectively, according to one embodiment.
Figure 9B:
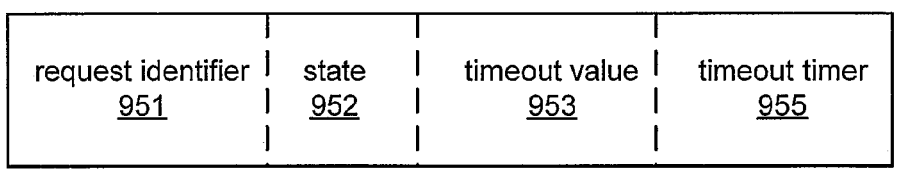

In various embodiments, an interaction structure for a processor and for a memory controller may include more, fewer, or different elements than those illustrated in FIGS. 9A and 9B. Similarly, there may be more, fewer, or different transaction codes included in broadcast or unicast packets communicated when allocating and/or reserving remote memory in a NUMA shared memory multiprocessor computer system than those illustrated in Table 4.

As shown by the exemplary transaction codes illustrated in Table 4, a reservation protocol for use in unreliable transport situations may include a four-way handshake, rather than the simple request/reply protocol described earlier. In this example, if a responding memory controller is able to satisfy a memory allocation request, it may return a memory reservation acknowledgement message (reserve ack). The requesting processor may then send another packet containing a confirmation acknowledgement to the responding memory controller to indicate that it has received the reserve ack and that it has assigned this memory controller to handle its request. The memory controller may then send a commit packet, indicating that it has allocated memory to the request and that it is ready to receive normal memory operation packets (e.g., read requests and write requests). In some embodiments, the packets exchanged as part of the reservation protocol may include the elements described earlier for implementing a proximity-based search methodology. Once a suitable memory node has been identified using the proximity-based search methodology, the reservation protocol may be used to maintain interaction with the memory node and/or to monitor the continued interaction with the memory node until it is no longer needed by the processor.

The reservation protocol may in some embodiments be implemented in one or more hardware-based state machines, such as in a processor state machine and a memory controller state machine. For example, the protocol may be implemented using specialized circuitry within the processor and/or the memory controller. Exemplary state machines for a requesting processor and a responding memory controller are illustrated in FIGS. 10 and 11, respectively, and are described in more detail below.

Figure 10:
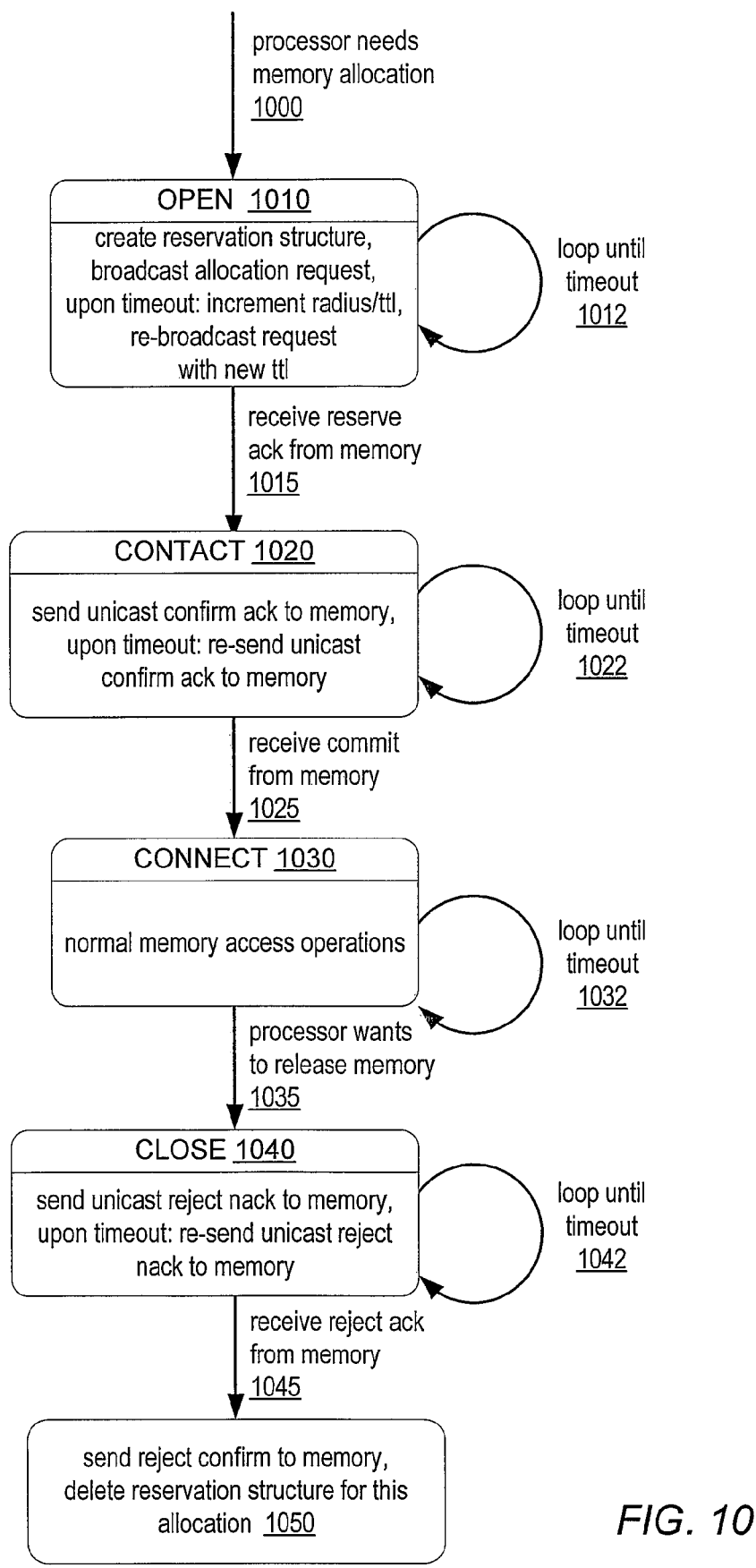
FIG. 10 is a state transition diagram illustrating a reservation protocol implemented on a requesting processor, according to one embodiment.
Figure 11:
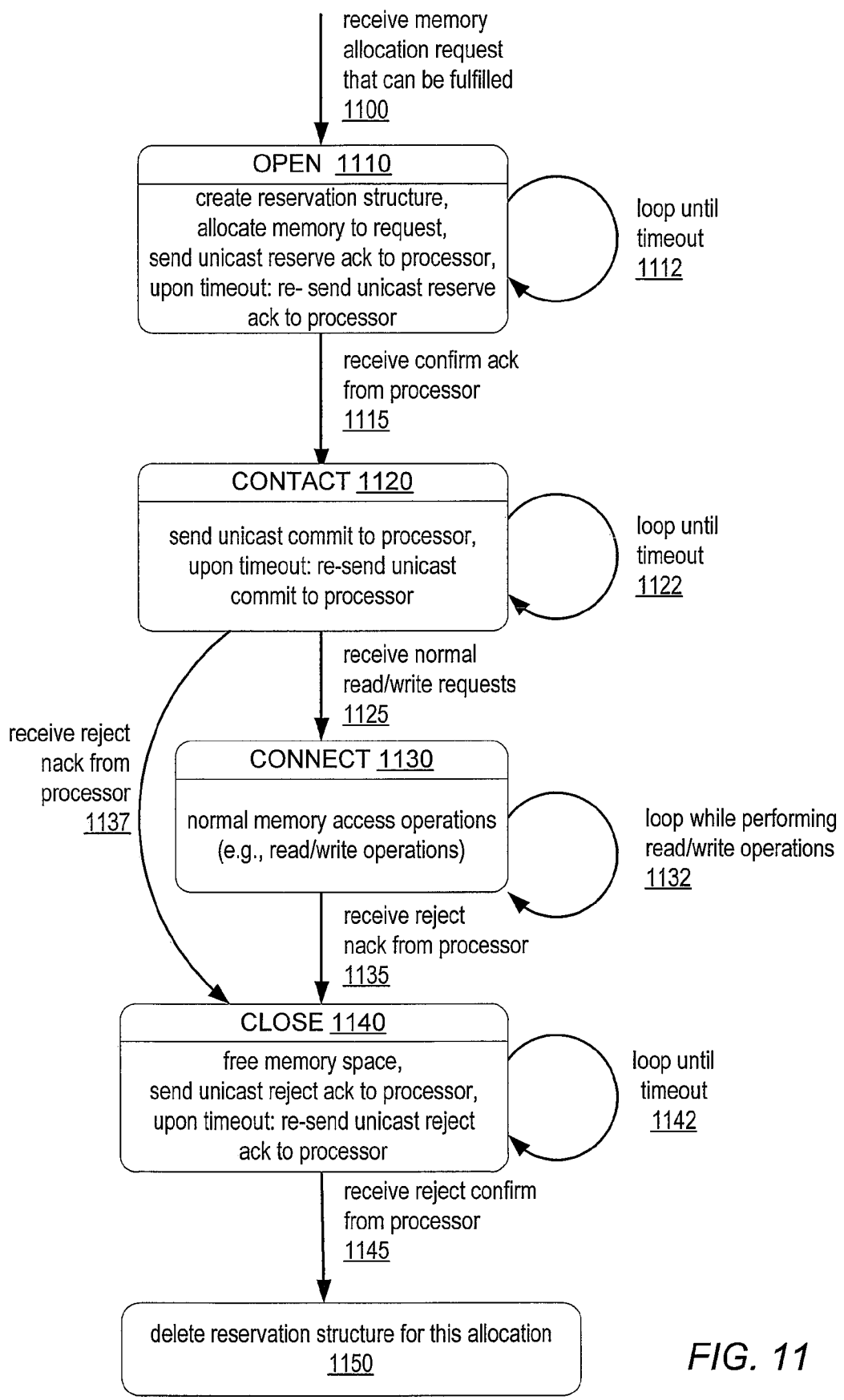
FIG. 11 is a state transition diagram illustrating a reservation protocol implemented on a responding memory node, according to one embodiment.

In the example state machine illustrated in FIG. 10, a processor (such as a processor of a processor node 110 or hybrid node 130) may enter the OPEN state 1010 in response to a need to allocate memory to a particular process, as in 1000. Upon entering the OPEN state (or prior to entering the OPEN state), the processor may be configured to create the interaction structure described above (which may also be referred to as a "reservation structure"), including creating a unique request identifier. The processor may set the initial timeout value (e.g., t0=T), initialize the timeout timer, and set the initial radius value to 1 (as described above regarding the proximity-based search methodology). The processor may then broadcast a memory allocation request packet (including the request identifier, the TTL value, and transaction code 1) to one or more memory nodes and wait for a reply containing a reserve ack packet that includes the unique request identifier. Each time the timeout timer reaches the timeout value without the processor receiving the corresponding reserve ack, the processor may increment the timeout value, reset the timeout timer, and increment the TTL value, as in the proximity-based search methodology described above. This is illustrated as loop 1012.

In response to the processor receiving a reserve ack packet corresponding to its request from a memory controller, shown as 1015, the processor may transition from the OPEN state 1010 to the CONTACT state 1020. Upon entering the CONTACT state, the processor may be configured to send a unicast confirm packet to the responding memory controller to indicate that the reserve ack packet has been received and that the processor intends to assign the memory controller to the memory allocation request. The processor may then reset the timeout timer and wait for a reply containing a commit packet. In some embodiments, the processor may re-initialize or increment the timeout value upon entering the CONTACT state, while in others the timeout value may remain as it was at the time the CONTACT state was entered (i.e., it may correspond to the timeout value when the memory node was located using the proximity-based search methodology, and/or may be dependent on the TTL value in the reserve ack packet header) For example, in some embodiments, the actual radius may be equal to the difference between a default radius value (e.g., 255) and what is left in the TTL field of the reserve ack packet header when it is received. Each time the timeout timer reaches the timeout value without the processor receiving a commit packet, the processor may reset the timeout timer and re-send the confirm packet. This is illustrated as loop 1022.

In response to the processor receiving a commit packet from the memory controller, shown as 1025, the processor may transition from the CONTACT state 1020 to the CONNECT state 1030. Upon entering the CONNECT state, the processor may be configured to begin normal memory access operations, such as read and write operations to the allocated memory node. In some embodiments, these memory access operations may include the exchange of request and acknowledgement packets between the processor and the memory node. For example, the processor may send a unicast read request packet to the memory node and may receive a unicast read acknowledgement (read ack) packet from the memory node in response. Similarly, the processor may send a unicast write request packet to the memory node and may receive a unicast write acknowledgement (write ack) packet from the memory node in response. These transaction types are illustrated in Table 4 above as transaction codes 5-8.

In some embodiments, each time a read request packet or write request packet is sent to the memory controller, the processor may reset the timeout timer and wait for a corresponding acknowledgement packet. This is illustrated as loop 1032. In some embodiments, the processor may re-initialize or increment the timeout value upon entering the CONNECT state, while in others the timeout value may remain as it was at the time the CONNECT state or a previous state (e.g., the CONTACT state) was entered. In some embodiments, if a corresponding acknowledgement packet is not received before the timeout timer reaches the timeout value, the read or write request may be re-sent to the memory controller.

Once the processor no longer needs the memory allocation specified in the original memory allocation request and wants to release the memory, as in 1035, the processor may transition from the CONNECT state 1030 to the CLOSE state 1040. Upon entering the CLOSE state, the processor may be configured to send a unicast reject packet, (e.g., a reject negative acknowledgement, or reject nack, packet) to the memory node, in some embodiments. The processor may then wait for a unicast reject ack packet from the memory node indicating that the allocated memory has been freed by the memory controller for the use of other processes. In some embodiments, the processor may be configured to reset the timeout timer when sending the reject nack packet, using a value determined in a previous state or in the CLOSE state. If the timer reaches the timeout value before the processor receives a reject ack packet from the memory node, the timer may be reset and the reject nack packet may be re-sent to the memory node. This is illustrated as loop 1042.

In response to receiving a reject ack packet from the memory node, shown as 1045, the processor may exit the CLOSE state 1040. In the example illustrated in FIG. 10, the processor may be configured to delete the reservation structure for this memory allocation, as shown in 1050. As previously noted, this may involve updating a registry or table containing the reservation structure. In some embodiments, the processor may also be configured to send a reject confirm packet to the memory to indicate that it has received the reject ack packet.

The state machine illustrated in FIG. 10 includes the terminal state CLOSE 1040. In this example, after the processor exits the CLOSE state 1040, the state machine may not be operable until its operation is triggered by another memory allocation request (as in 1000). In such embodiments, if another memory allocation request is needed, the processor may initiate the operations illustrated for the new memory allocation request. In other embodiments, after exiting the CLOSE state 1040, the processor may enter an IDLE state (not shown). In such embodiments, the state machine may remain in the IDLE state until or unless the processor needs to allocate memory for a process, at which point the processor may transition to the OPEN state 1010 and repeat the operations illustrated for the new memory allocation request.

Note that if the processor receives any additional reserve ack packets while in the CONTACT or CONNECT states, it may in some embodiments be configured to send a reject nack to the additional responding memory node(s). This may indicate to the additional memory node(s) that the request has already been met and that the memory reserved by the additional node(s) will not be needed by the requesting processor. Thus, the additional memory nodes may free up the memory allocated for the request and delete any reservation structures that may have been created on additional memory nodes.

Note also that if the processor receives any reserve ack packets from a responding memory node that include a request identifier that does not match its current memory allocation request, the processor may in some embodiments be configured to reply to the responding memory node with a reject nack packet. In such cases, the processor may receive a reject ack packet from the responding memory and may reply with a corresponding reject confirm packet.

Note that while the state machine illustrated in FIG. 10 has been described above as corresponding to a single memory request and its corresponding reservation, in some embodiments, a single state machine may be configured to manage the states of multiple memory requests and reservations. For example, a single allocation/reservation circuit (e.g., a portion of the processor node circuitry) may be configured to implement the four-way handshaking protocol for multiple requests and to manage a registry or table of reservation structures for each of the requests. In such embodiments, the single circuit may be configured to update the value of the STATE field for each reservation structure in response to the execution of the handshaking protocol by the processor node for the corresponding memory request.

In some embodiments, a maximum number of retries may be set for one or more of the loops illustrated in FIG. 10 (e.g., loops 1022 and 1032), after which the connection with the memory node may be assumed to be permanently disabled. In such embodiments, the processor may be configured to indicate an error, to delete the reservation structure for the given memory request, and/or to request a new allocation for the given memory request by repeating the operations illustrated in FIG. 10. If a maximum number of retries is reached for loop 1042, the processor may in some embodiments be configured to indicate an error and/or to delete the reservation structure for the given memory request, but not to request a new allocation for the given memory request. Note also that while the example above includes a timeout timer that is a component of a reservation structure for a particular memory request, in other embodiments, the timeout timer may be implemented as a separate hardware or software structure on the processor node or elsewhere and/or may be shared between two or more memory requests for management of their allocations/reservations.

The exemplary state machine illustrated in FIG. 11 may be implemented on a memory node, such as in the memory controller portion of a memory node 120 or a hybrid node 130, in some embodiments. In this example, operation of the state machine illustrated in FIG. 11 may be triggered when the memory node receives a memory allocation request packet from a processor that can be satisfied by the memory node, shown as 1100. In response to receiving the memory allocation request packet, the memory controller may enter the OPEN state 1110. Upon entering the OPEN state 1110, the memory controller of the memory node may create an interaction structure (e.g., a reservation structure) for managing the interaction between the requesting processor and the responding memory node for this allocation. The reservation structure may include some or all of the elements illustrated in FIG. 9B, or it may include more or different elements, in various embodiments.

While in the OPEN state 1110, the memory controller may be configured to allocate the requested memory to the memory allocation request, to send a unicast reserve ack packet back to the requesting processor to indicate that it can satisfy the memory allocation request, and to wait for a confirmation acknowledgement (confirm ack) packet from the processor. In some embodiments, the memory controller may initialize a timeout timer and/or set a timeout value dependent on the radius (TTL) contained in the received memory allocation request packet. In other embodiments, the memory controller may set the timeout value and/or initialize the timeout timer according to different criteria, such as a maximum transmission delay and/or a processing delay in the memory controller. In some embodiments, if the memory controller does not receive a confirm ack packet from the processor before the timeout timer reaches the timeout value, the memory controller may be configured to re-send the reserve ack packet to the requesting processor. This is illustrated as loop 1112.

In response to receiving a confirm ack packet from the processor, as in 1115, the memory controller may transition from the OPEN state 1110 to the CONTACT state 1120. In the CONTACT state 1120, the memory controller may be configured to send a unicast commit packet back to the requesting processor and to wait to receive normal memory access packets (e.g., read requests and write requests.) In some embodiments, the memory controller may be configured to initialize the timeout timer and/or to modify the timeout value when the commit packet is sent. If the memory controller does not receive any normal memory access packets before the timeout timer reaches the timeout value, the memory controller may in some embodiments be configured to re-send the commit packet to the requesting processor. This is illustrated as loop 1122.

In some embodiments, in response to receiving normal memory access packets, as in 1125, the memory controller may transition from the CONTACT state 1120 to the CONNECT state 1130. In other embodiments, the memory controller may transition from the CONTACT state 1120 to the CONNECT state 1130 as soon as it is ready to receive such packets. In other words, the memory controller may transition to the CONNECT state 1130 after sending the commit message to the processor, but before receiving any normal memory access packets. In this example, upon entering the CONNECT state 1130, the memory controller may be configured to perform memory operations on behalf of the requesting processor using the allocated memory. For example, in response to receiving a write request packet, the memory controller may write one or more values to the allocated memory and may reply to the requesting processor with a write ack packet. In another example, in response to receiving a read request packet, the memory controller may be configured to return one or more values from the allocated memory and may reply to the requesting processor with a read ack packet. These operations may in some embodiments be repeated until the memory controller receives a reject nack from the processor. This is illustrated as loop 1132.

As noted above, in some embodiments there may be a timeout associated with normal memory access operations. For example, if the processor does not receive a write ack or read ack packet from the memory controller within a given timeout period after sending a read or write request packet, the processor may re-send the read or write request packet and the memory controller may be configured to repeat the operation and/or to re-send its reply packet (e.g., a read ack or a write ack packet).

Note also that the memory controller may in some embodiments receive a reject nack packet from the processor while in the CONTACT state 1120. For example, if the processor receives multiple reserve ack packets (e.g., from multiple memory nodes), the processor may determine that another memory node will be allocated to its memory request after having sent the confirm ack packet to one or more other memory nodes. In such cases, the processor may then send one or more reject nack packets to the memory nodes that will not be allocated to its request. If the memory node receives a reject nack packet from the memory node while in the CONTACT state 1120, it may in some embodiments transition from the CONTACT state 1120 directly to the CLOSE state 1140, rather than passing through the CONNECT state 1130. This is illustrated as path 1137.

In response to receiving a reject nack from the processor while in the CONNECT state 1130, the memory controller may transition from the CONNECT state 1130 to the CLOSE state 1140. In some embodiments, upon entering the CLOSE state 1140, the memory controller may be configured to free the allocated memory space, to send a unicast reject ack packet back to the processor, and to wait for a reject confirm packet from the processor. If the timeout timer reaches the timeout value before a reject confirm packet is received from the processor, the memory controller may in some embodiments be configured to re-send the reject ack packet to the processor. This is illustrated as loop 1142.

In response to receiving a reject confirm packet from the processor, as in 1145, the memory controller may in some embodiments exit the CLOSE state 1140 and may delete the reservation structure for this memory allocation. As previously noted, this may involve updating a registry or table containing the reservation structure for the allocation.

In the example illustrated in FIG. 11, the CLOSE state 1140 may be a terminal state of the state machine and the state machine may be inoperable until the memory controller re-enables it in response to receiving another memory allocation request that may be satisfied by the memory node. In such embodiments, if another such request is received the memory controller may initiate the operations illustrated in FIG. 11 for the new memory allocation request. In other embodiments, after exiting the CLOSE state 1140, the processor may enter an IDLE state (not shown). In such embodiments, the state machine may remain in the IDLE state until or unless the memory controller receives a request to allocate memory for a given process, at which point the memory controller may transition to the OPEN state 1110 and repeat the operations illustrated for the new memory allocation request.

As on the processor node, a maximum number of retries may be set for one or more of the loops illustrated in FIG. 11 (e.g., loops 1112, 1122, 1132, and 1142), after which the connection with the processor node may be assumed to be permanently disabled. In such embodiments, the memory node may be configured to indicate an error, to delete the reservation structure for the given memory request, and/or to free the memory allocated to the given memory request. Note also that while the example above includes a timeout timer that is a component of a reservation structure for a particular memory request, in other embodiments, the timeout timer may be implemented as a separate hardware or software structure on the memory node (e.g., in the memory controller) or elsewhere and/or may be shared between two or more memory requests for management of their allocations/reservations.

Note that while the state machine illustrated in FIG. 11 has been described above as corresponding to a single memory request and its corresponding reservation, in some embodiments, a single state machine may be configured to manage the states of multiple memory requests and reservations. For example, a single allocation/reservation circuit (e.g., a portion of a memory controller) may be configured to implement the four-way handshaking protocol for multiple requests and to manage a registry or table of reservation structures for each of the requests. In such embodiments, the single circuit may be configured to update the value of the STATE field for each reservation structure in response to the execution of the handshaking protocol by the memory controller for the corresponding memory request.

The reservation protocol described herein may be suitable for use in systems having an unreliable underlying transport layer. Although the reservation protocol has been described as operating in conjunction with a proximity-based search, it may also be employed in systems having a different method for locating and allocating memory for a given process.

While in the examples above the reservation protocol has been described as being implemented in one or more hardware-based state machines, the protocol may be implemented using any hardware or software configuration suitable for carrying out the functionality described. For example, the reservation protocol may in some embodiments be implemented as one or more software-based state machines or in one or more other types of software modules (e.g., in one or more software modules of an operating system). Similarly, the reservation protocol may be implemented in any combination of hardware and software configured to implement the four-way handshake protocol described herein.

A state machine of a processor or memory controller suitable for implementing the reservation protocol may include more, fewer or different states than those illustrated and described herein, in various embodiments. In addition, in some embodiments, a single state machine of a processor or memory controller may be configured to implement both the proximity-based search methodology and the reservation protocol described herein, while in other embodiments the functionality of the proximity-based search methodology and the reservation protocol may be partitioned into two or more state machines on a processor node and/or on a memory node. As previously noted, in some embodiments each memory request and corresponding allocation/reservation may be managed by a dedicated state machine, while in others, multiple requests and corresponding allocations/reservations may be managed by a single state machine implementation.

To minimize any impact of the four-way handshake of the reservation protocol on latency, the memory controller may in some embodiments include very fast circuitry to implement its relatively simple control logic. In other embodiments, any apparent latency may be minimized by distributing the bulk of the necessary memory control logic between one or more dedicated processors. Each of these processors may not execute any other application software, but may be dedicated to handling memory control for a portion of the memory in the system. Each of these processors may in some embodiments be restricted to running a single-threaded kernel process and, hence, may respond very quickly during handshaking.

Although the reservation protocol is described herein in the context of proximity-based memory allocation and deallocation in a NUMA shared memory, multiprocessor architecture, it may be easily applied to other resource reservation situations. For example, the protocol may be applied to resources other than memory when achieving a robust hand-shake is required in the face of an unreliable networking transport.

In some embodiments, as described above, the memory controller of each memory node/carrier may be configured to keep track of which processor has allocated what portion(s) of its memory using a reservation structure, such as that illustrated in FIG. 9B. In other embodiments, memory nodes/carriers may not be configured to keep track of memory allocations themselves, but this information may be maintained elsewhere in the system. For example, in some embodiments, a particular portion of each memory (e.g., each memory array) may be used as the storage area for its allocation bookkeeping information. In other embodiments, allocation bookkeeping information may be stored elsewhere on the corresponding memory node/carrier, such as in a registry, table, or database separate from the allocated memory array, or may be stored on one or more other nodes connected via network 100. This bookkeeping information may be accessed by the memory controller of the corresponding node or by a processor configured to control and track memory allocation.

In some embodiments, one or more processors on one or more nodes connected via network 100 may be configured to manage allocation bookkeeping information (e.g., to maintain reservation structures on behalf of one or more other nodes). In some embodiments, tracking of memory allocations within a plurality of memory nodes/carriers may be distributed among a group of processors on one or more nodes connected to those memory nodes/carriers via network 100. In still other embodiments, one or more processors may be dedicated to memory management purposes; e.g., they may run single-threaded kernel processes that do nothing except handle memory requests, on memories under their control, from other general-purpose processors. The reservation protocol described herein may be employed within any of these embodiments in fundamentally the same fashion, whether the logic to determine if a memory can satisfy a request, the logic to determine when and where to send or relay a packet, or the logic to manage the four-way handshake protocol is part of a memory node 120 or part of another node, such as a processor node 110, a hybrid node 130, or some other node 140.

The reservation protocol described herein may be implemented in hardware (such as in one or more integrated circuits or printed circuit boards), software (executing on a processor 210 or another suitable device), or a combination of hardware and software, according to various embodiments. For example, the protocol may be implemented in hardware, using an electronic circuit configured to implement one or both of the state machines illustrated in FIGS. 10 and 11; or in software, using program instructions for performing the functionality of the state machines illustrated in FIGS. 10 and 11. The memory allocation reservation protocol may be partially or totally automated, in some embodiments, such that a program executing in a computer system employing the reservation protocol may not include specific instructions for carrying out the four-way handshake when allocating nearby memory. In such cases, the use of the reservation protocol may not require input or knowledge on the part of a programmer, as the operating system, or other software or hardware, may be configured to allocate nearby memory to each program using the reservation protocol at run-time.

In some embodiments, program instructions may be configured to implement the reservation protocol, as described herein and according to various embodiments. A computing system capable of implementing the reservation protocol may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Figure 12:
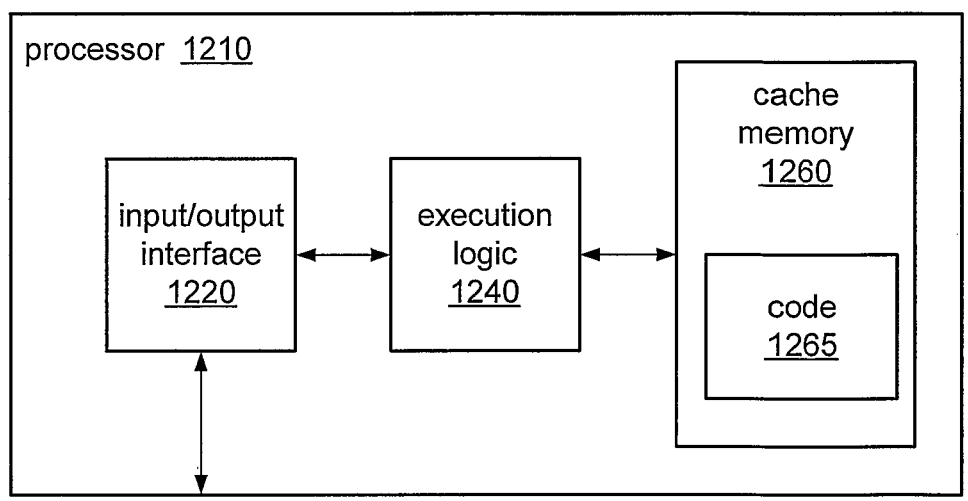
FIG. 12 illustrates one embodiment of a processor suitable for implementing a reservation protocol for memory allocation over an unreliable packet transport.

In some embodiments, the reservation protocol may be implemented in one or more processors, such as processor 1210 of FIG. 12. In the example illustrated by FIG. 12, processor 1210 may comprise an input/output interface 1220, execution logic 1240, and a cache memory 1260. In other embodiments, processor 1210 may include multiple input/output interfaces 1220 and/or cache memories 1260, and execution logic 1240 may be partitioned into two or more blocks of logic according to its functionality or other attributes.

In some embodiments, execution logic 1240 may include hardware, such as electronic circuits, configured to implement the reservation protocol, as described herein. Execution logic 1240 may also include logic configured to implement other functionality of processor 1210, e.g., address calculation, instruction fetch and execution, arithmetic calculations, Boolean calculations and manipulations, digital signal processing, or any other functionality of a general-purpose or special-purpose processor, according to various embodiments. For example, execution logic 1240 may be configured to allow processor 1210 to implement any of various instruction set architectures, such as x86, SPARC, PowerPC, etc. In some embodiments, execution logic 1240 may be configured to implement a single CPU core, multiple CPU cores, or any combination of one or more general-purpose CPU cores and special-purpose cores (e.g., digital signal processors, hardware accelerators, co-processors, etc.) In various embodiments, execution logic 1240 may be configured to implement a superscalar architecture or may be configured to implement multi-threading.

In some embodiments, the reservation protocol described herein may be implemented by program instructions stored in cache memory 1260 and executed by processor 1210. Such program instructions are shown in FIG. 12 as code 1265 stored within cache memory 1260. In still other embodiments, the reservation protocol may be implemented by program instructions stored in another type of computer-accessible medium, which may or may not be separate from processor 1210, and executed by processor 1210. Examples of such computer-accessible media include, but are not limited to, installation media, e.g., a CD-ROM or floppy disk, computer system memory such as DRAM, SRAM, EDO RAM, SDRAM, DDR SDRAM, Rambus RAM, flash memory, etc., or non-volatile memory such as a magnetic media, e.g., a hard drive or optical storage. In one embodiment, program instructions configured to implement the reservation protocol may be stored in memory co-located with processor 1210, such as a memory 220 on a processor node 110 or a hybrid node 130. In some embodiments, the operations and functions comprising the reservation protocol may be partitioned between local memory, such as cache memory 1260 or memory local to a processor or hybrid node comprising processor 1210, and non-local memory. The reservation protocol functionality may be implemented in any of various programming languages or methods, according to various embodiments.

In some embodiments, input/output interface 1220 may be configured to couple processor 1210 directly to a computer system network, such as network 100. In other embodiments, input/output interface 1220 may be configured to couple processor 1210 to a network interface, such as a network interface 250 on a processor node 110 or a hybrid node 130. In some embodiments, input/output interface 1220 may be configured to implement one or more of various interface or network standards, e.g., Peripheral Component Interconnect (PCI), Ethernet, HyperTransport (HT), Infiniband, or any variant or successor of these or other suitable input/output protocols. In some embodiments, input/output interface 1220 may incorporate some or all of the functionality of network interface 250. In other embodiments, some or all of the functionality of input/output interface 1220 may be included in network interface 250, rather than in processor 1210.

The functionality of step referred to herein may correspond to the functionality of hardware or software modules or portions of hardware or software modules, according to various embodiments. The operations referred to herein may be modules or portions of modules (e.g., software, firmware, or hardware modules), according to various embodiments. For example, software modules implementing the reservation protocol may include source, script, batch or other executable files, or combinations and/or portions of such files. In some embodiments, software modules implementing the reservation protocol may include a computer program or subroutines thereof encoded on one or more computer accessible media.

Additionally, those skilled in the art will recognize that the boundaries between modules and/or components are merely illustrative and alternative embodiments may merge modules/components or impose an alternative decomposition of functionality of modules and components. For example, the modules discussed herein may be decomposed into sub-modules to be executed as multiple computer processes or to be implemented as multiple hardware components (such as integrated circuits and/or printed circuit boards). Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention, according to various alternate embodiments.

Thus, the flows described herein, the operations thereof and modules therefore may be implemented in hardware on a computer system configured to execute the operations of the flows and/or may be implemented in software executed by the computer system from computer accessible media, according to various embodiments. In some embodiments, the flows may be embodied in a machine-readable and/or computer accessible medium for configuring a computer system to execute the flows, as described above. Thus, one or more software modules implementing all or part of a reservation protocol, as described herein, may be stored within and/or transmitted to a computer system memory to configure the computer system to perform the functions of the module(s), according to various embodiments.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
   a processor node comprising a processor and a network interface;
   a plurality of memory nodes, wherein each memory node comprises a memory and a network interface;
   a communication network configured to interconnect said processor node and said plurality of memory nodes via said network interfaces according to a network topology, wherein each of said memory nodes is removed from said processor node by a respective number of network hops according to said network topology;
wherein said processor node is configured to:
broadcast, over the communication network, a packet comprising a memory request message to a subset of said plurality of memory nodes comprising two or more memory nodes, wherein the memory request message comprises a unique identifier of a given memory request and a requested memory size;
receive, over the communication network, a reservation acknowledgment message from one or more of the memory nodes in the subset of memory nodes;
send, over the communication network, a confirmation message comprising the unique identifier to a particular one of the memory nodes in the subset of memory nodes from which a reservation acknowledgment message was received;
receive, over the communication network, a commit message from the particular one of the memory nodes indicating that the memory has been allocated for the given memory request; and
access memory on the particular one of the memory nodes in response to receiving the commit message from the particular one of the memory nodes indicating that the memory has been allocated for the given memory request.

2. The system of claim 1, wherein the processor node is further configured to create a reservation structure for the given memory request comprising the unique identifier and a timeout value, and wherein in response to a timer reaching the timeout value before a reply message is received in response to a given message being sent by the processor node, the processor node is further configured to re-send the given message.

3. The system of claim 1, wherein the particular one of the memory nodes is configured to reserve a portion of memory at least as large as the requested memory size and to send a reservation acknowledgement message comprising the unique identifier to the processor node in response to receiving the given memory request and determining that the given memory request can be satisfied by the particular one of the memory nodes.

4. The system of claim 1, wherein the particular one of the memory nodes is further configured to create a reservation structure for the given memory request comprising the unique identifier and a timeout value, and wherein in response to a timer reaching the timeout value before a reply message is received in response to a given message being sent by the particular one of the memory nodes, the particular one of the memory nodes is further configured to re-send the given message.

5. The system of claim 1, wherein the particular one of the memory nodes is further configured to send a commit message comprising the unique identifier to the processor node in response to receiving the confirmation message from the processor node.

6. The system of claim 1, wherein the particular one of the memory nodes is further configured to send a read acknowledgement message comprising the unique identifier to the processor node in response to receiving a read request message comprising the unique identifier from the processor node subsequent to receiving the confirmation message, and wherein the particular one of the memory nodes is further configured to send a write acknowledgement message comprising the unique identifier to the processor node in response to receiving a write request message comprising the unique identifier from the processor node subsequent to receiving the confirmation message.

7. The system of claim 1, wherein the processor node is further configured to send a reject message comprising the unique identifier to the particular one of the memory nodes to indicate that it no longer requires access to the memory allocated for the given memory request.

8. The system of claim 7, wherein the particular one of the memory nodes is further configured to free the memory allocated for the given memory request and to send a reject acknowledgement message comprising the unique identifier to the processor node in response to receiving the reject message from the processor node.

9. The system of claim 8, wherein the processor node is further configured to send a reject confirmation message comprising the unique identifier to the particular one of the memory nodes in response to receiving the reject acknowledgement message from the particular one of the memory nodes.

10. The system of claim 1,
wherein each memory node of said subset is removed from said processor node by no more than a given number of network hops; and
wherein in response to failing to receive a reservation acknowledgement message from any memory node of said subset indicating that it can satisfy the given memory request, the processor node is further configured to increase said given number of network hops and to broadcast the memory request message to a second subset of said plurality of memory nodes, wherein each memory node of said second subset is removed from said processor node by no more than said increased given number of network hops.

11. The system of claim 10, wherein in response to failing to receive a reservation acknowledgement message from any memory node of said second subset indicating that it can satisfy the given memory request, the processor node is further configured to continue to increase said given number of network hops and to broadcast the memory request message to a corresponding subset of said plurality of memory nodes, wherein each memory node of said corresponding subset is removed from said processor node by no more than said increased given number of network hops, until at least one of the following occurs: one or more of said plurality of memory nodes indicates that it can satisfy the given memory request in response to receiving the given memory request, said processor node has broadcast the memory request message to each of said plurality of memory nodes, or a time-out condition has been met.

12. A method, comprising:
broadcasting, by a processor node, over a communication network, a packet comprising a memory request message to a plurality of memory nodes, wherein the memory request message comprises a unique identifier of a given memory request and a requested memory size, and wherein said plurality of memory nodes and said processor node are interconnected via the communication network according to a network topology;
receiving, by the processor node, over the communication network, a reservation acknowledgment message from one or more of the plurality of memory nodes;
sending, by the processor node, over the communication network, a confirmation message to a particular one of the plurality of memory nodes from which a reservation acknowledgment message was received;

receiving, by the processor node, over the communication network, a commit message from the particular one of the memory nodes indicating that the memory has been allocated for the given memory request; and accessing, by the processor node, memory on the particular one of the memory nodes in response to receiving the commit message from the particular one of the memory nodes indicating that the memory has been allocated for the given memory request.

13. The method of claim 12, further comprising:

creating, by the processor node, a reservation structure for the given memory request comprising the unique identifier and a timeout value; and re-sending, by the processor nod, a given message in response to a timer reaching the timeout value before a reply message is received in response to the given message being sent by the processor node.

14. The method of claim 12, further comprising:

reserving, by the particular one of the memory nodes, a portion of memory at least as large as the requested memory size; and sending, by the particular one of the memory nodes, a reservation acknowledgement message comprising the unique identifier to the processor node in response to receiving the given memory request and determining that the given memory request can be satisfied by the particular one of the memory nodes.

15. The method of claim 12, further comprising:

creating, by the particular one of the memory nodes, a reservation structure for the given memory request comprising the unique identifier and a timeout value, wherein the timeout value is dependent on a time-to-live value included in the memory request message; and re-sending, by the particular one of the memory nodes, a given message in response to a timer reaching the timeout value before a reply message is received in response to the given message being sent by the particular one of the memory nodes.

16. The method of claim 12, further comprising:

sending, by the processor node, a reject message comprising the unique identifier to the particular one of the memory nodes to indicate that it no longer requires access to the memory allocated for the given memory request;

freeing, by the particular one of the memory nodes, the memory allocated for the given memory request in response to receiving the reject message from the processor node;

sending, by the particular one of the memory nodes, a reject acknowledgement message comprising the unique identifier to the processor node in response to receiving the reject message from the processor node; and sending, by the processor nod, a reject confirmation message comprising the unique identifier to the particular one of the memory nodes in response to receiving the reject acknowledgement message from the particular one of the memory nodes.

17. A processor node, comprising:

an input/output interface comprising electronic circuitry that is configured for communicating with a communication network, wherein said communication network is configured to interconnect a plurality of memory nodes according to a network topology; and execution logic comprising electronic circuitry that is configured to:

broadcast, over the communication network, a packet comprising a memory request message to the plurality of memory nodes, wherein the memory request message comprises a unique identifier of a given memory request and a requested memory size;

receive, over the communication network, a reservation acknowledgment message from one or more of the memory nodes;

send, over the communication network, a confirmation message to a particular one of the memory nodes from which a reservation acknowledgment message was received;

receive, over the communication network, a commit message from the particular one of the memory nodes indicating that the memory has been allocated for the given memory request; and access memory on the particular one of the memory nodes in response to receiving the commit message from the particular one of the memory nodes indicating that the memory has been allocated for the given memory request.

18. The processor node of claim 17, wherein the execution logic is further configured to:

send a reject message comprising the unique identifier to the particular one of the memory nodes to indicate that it no longer requires access to the memory allocated for the given memory request; and send a reject confirmation message comprising the unique identifier to the particular one of the memory nodes in response to receiving a reject acknowledgement message comprising the unique identifier from the particular one of the memory nodes.

19. A memory node, comprising:

a memory;

an input/output interface configured for communicating with a communication network, wherein said communication network is configured to interconnect a processor node and a plurality of memory nodes according to a network topology; and execution logic configured to:

receive from the processor node, over the communication network, a packet comprising a memory request message, wherein the packet comprises a transaction code indicating that the packet type is a broadcast packet, and wherein the memory request message comprises a unique identifier of a given memory request and a requested memory size;

in response to receiving the given memory request and determining that the given memory request can be satisfied by the memory node:

reserve a portion of memory at least as large as the requested memory size; and send, over the communication network, a reservation acknowledgement message comprising the unique identifier to the processor node;

receive, over the communication network, a confirmation message from the processor node; and send to the processor node, over the communication network, a commit message indicating that the memory has been allocated for the given memory request and comprising the unique identifier in response to receiving the confirmation message from the processor node.

20. The memory node of claim 19, wherein the execution logic is further configured to:

free the memory allocated for the given memory request and send a reject acknowledgement message comprising the unique identifier to the processor node in response to receiving a reject message from the processor node.

* * * * *